US012793275B2

(12) United States Patent
Hu

(10) Patent No.: US 12,793,275 B2
(45) Date of Patent: Nov. 10, 2026

(54) DATA PROCESSING METHOD AND RELATED DEVICE FOR POINT CLOUD MEDIA

(71) Applicant: Tencent Technology (Shenzhen) Company Limited, Shenzhen (CN)

(72) Inventor: Ying Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/989,612

(22) Filed: Dec. 20, 2024

(65) Prior Publication Data

US 2025/0131598 A1 Apr. 24, 2025

Related U.S. Application Data

(63) Continuation of application No. PCT/CN2023/106302, filed on Jul. 7, 2023.

(30) Foreign Application Priority Data

Aug. 19, 2022 (CN) ......................... 202211001664.0

(51) Int. Cl.
*G06T 9/00* (2006.01)
*H04N 19/132* (2014.01)
(Continued)

(52) U.S. Cl.
CPC ............. *G06T 9/00* (2013.01); *H04N 19/132* (2014.11); *H04N 19/136* (2014.11); *H04N 19/184* (2014.11); *H04N 19/30* (2014.11)

(58) Field of Classification Search
CPC ...... G06T 9/00; H04N 19/132; H04N 19/136; H04N 19/184; H04N 19/30
(Continued)

(56) References Cited

U.S. PATENT DOCUMENTS

2019/0197739 A1* 6/2019 Sinharoy ................ G06F 18/23
2020/0111236 A1 4/2020 Tourapis et al.
(Continued)

FOREIGN PATENT DOCUMENTS

CN 110971906 A 4/2020
CN 113826385 A 12/2021
(Continued)

OTHER PUBLICATIONS

International Search Report and Written Opinion issued in International application No. PCT/CN2023/106302, dated Sep. 23, 2023, 13 pages (with English translation).
(Continued)

*Primary Examiner* — Allen C Wong
(74) *Attorney, Agent, or Firm* — Crowell & Moring LLP

(57) ABSTRACT

The disclosure relates to a data processing method and a related device for point cloud media. The method includes: obtaining a media file of point cloud media, the media file comprising a point cloud bitstream and cross-attribute dependency indication information of the point cloud media, and the cross-attribute dependency indication information being for indicating an encoding and decoding dependency relationship between attribute data in the point cloud bitstream; and decoding the point cloud bitstream based on the cross-attribute dependency indication information to present the point cloud media.

19 Claims, 5 Drawing Sheets

(51) Int. Cl.
*H04N 19/136* (2014.01)
*H04N 19/184* (2014.01)
*H04N 19/30* (2014.01)

(58) Field of Classification Search
USPC ........................................................ 375/240.02
See application file for complete search history.

(56) References Cited

U.S. PATENT DOCUMENTS

| | | | | |
|---|---|---|---|---|
| 2020/0217937 | A1 | 7/2020 | Mammou et al. | |
| 2021/0029187 | A1* | 1/2021 | Oh | H04L 65/70 |
| 2022/0215596 | A1* | 7/2022 | Van der Auwera | H04N 19/25 |
| 2022/0353539 | A1* | 11/2022 | Huang | H04N 19/70 |
| 2023/0291918 | A1* | 9/2023 | Takahashi | H04N 19/174 |
| 2024/0314359 | A1* | 9/2024 | Xu | G06T 9/001 |

FOREIGN PATENT DOCUMENTS

| | | | |
|---|---|---|---|
| CN | 114097247 | A | 2/2022 |
| CN | 115379189 | A | 11/2022 |
| CN | 115396645 | A | 11/2022 |
| EP | 3751857 | A1 | 12/2020 |
| WO | WO 2019/076503 | A1 | 4/2019 |
| WO | WO 2022141461 | A1 | 7/2022 |

OTHER PUBLICATIONS

ISO/IEC JTC1/SC29/WG11; "Draft text of ISO/IEC FDIS 23090-18 Carriage of Geometry-based Point Cloud Compression Data", MPEG Meeting, Jun. 2021, (56 pages).

English-language Search Report issued in European Application No. 23854152.8 dated Oct. 29, 2025, (10 pages).

* cited by examiner

DATA PROCESSING METHOD AND RELATED DEVICE FOR POINT CLOUD MEDIA

RELATED APPLICATION

This application is a continuation application of PCT Patent Application No. PCT/CN2023/106302, filed on Jul. 7, 2023, which claims priority to Chinese Patent Application No. 202211001664.0, filed with the China National Intellectual Property Administration on Aug. 19, 2022, and entitled "DATA PROCESSING METHOD AND RELATED DEVICE FOR POINT CLOUD MEDIA", wherein the content of the above-referenced applications is incorporated herein by reference in its entirety.

FIELD OF THE TECHNOLOGY

This disclosure relates to the technical field of Internet, and in particular, to data processing of point cloud media.

BACKGROUND OF THE DISCLOSURE

With progressive development of point cloud technology, compression encoding of point cloud media becomes an important issue in research. The current point cloud compression supports cross-attribute encoding technologies, i.e., allows for unified encoding of different types of attribute data in point cloud media. However, the current cross-attribute encoding technologies still have some issues, e.g., not supporting partial transmission or partial decoding, and being likely to lead to resource waste on a decoding side. Hence, how to improve the cross-attribute encoding technologies becomes a hot topic in the technical field of point cloud compression.

SUMMARY

Embodiments of this disclosure provide a data processing method and a related device for point cloud media. The data processing method and the related device for point cloud media may guide transmission, decoding, and presentation of the point cloud media, support partial transmission and partial decoding at a decoding terminal, and optimize utilization of network bandwidths and computing resources of the decoding terminal.

In one aspect, an embodiment of this disclosure provides a data processing method for point cloud media, and the method includes:

obtaining a media file of point cloud media, the media file including a point cloud bitstream and cross-attribute dependency indication information of the point cloud media, and the cross-attribute dependency indication information being for indicating an encoding and decoding dependency relationship between attribute data in the point cloud bitstream; and decoding the point cloud bitstream based on the cross-attribute dependency indication information to present the point cloud media.

In one aspect, an embodiment of this disclosure provides a data processing method for point cloud media, and the method includes:

obtaining point cloud media, and encoding the point cloud media to obtain a point cloud bitstream;

generating cross-attribute dependency indication information based on an encoding and decoding dependency relationship between attribute data in the point cloud bitstream; and encapsulating the cross-attribute dependency indication information and the point cloud bitstream to obtain a media file of the point cloud media.

In one aspect, an embodiment of this disclosure provides a data processing apparatus for point cloud media, and the apparatus includes a memory operable to store computer-readable instructions and a processor circuitry operable to read the computer-readable instructions. When executing the computer-readable instructions, the processor circuitry is configured to:

obtain a media file of point cloud media, the media file comprising a point cloud bitstream and cross-attribute dependency indication information of the point cloud media, and the cross-attribute dependency indication information being for indicating an encoding and decoding dependency relationship between attribute data in the point cloud bitstream; and decode the point cloud bitstream based on the cross-attribute dependency indication information to present the point cloud media.

In one aspect, an embodiment of this disclosure provides a computer-readable storage medium, having a computer program stored therein, and the computer program is loaded by a processor to execute the aforementioned data processing method for point cloud media.

In one aspect, an embodiment of this disclosure provides a computer program product, the computer program product includes a computer program, and the computer program is stored in a computer-readable storage medium. A processor of a computer device reads the computer program from the computer-readable storage medium, and the processor executes the computer program to cause the computer device to execute the aforementioned data processing method for point cloud media.

In the embodiments of this disclosure, the media file of the point cloud media is obtained, the media file includes the point cloud bitstream and the cross-attribute dependency indication information of the point cloud media, and the cross-attribute dependency indication information is configured for indicating the encoding and decoding dependency relationship between the attribute data in the point cloud bitstream. The point cloud bitstream is decoded based on the cross-attribute dependency indication information to present the point cloud media. In such a case, transmission, decoding, and presentation of the point cloud media are guided, partial transmission and partial decoding at the decoding terminal are supported, and utilization of the network bandwidths and the computing resources of the decoding terminal is optimized.

DESCRIPTION OF EMBODIMENTS

The technical solutions in embodiments of this disclosure are clearly and completely described in the following with reference to the accompanying drawings in the embodiments of this disclosure. Apparently, the described embodiments are merely some rather than all of the embodiments of this disclosure. All other embodiments obtained by those of ordinary skill in the art based on the embodiments of this disclosure without making creative efforts shall fall within the protection scope of this disclosure.

Terms "first", "second", or the like used in this disclosure are configured for distinguishing between identical or similar items with substantially the same effects and functions. The terms "first", "second", and "$n^{th}$" are not logically or temporally dependent to each other, or restrictive to the quantity or the execution order.

In this disclosure, "at least one" means one or more, and "multiple" means two or more. Similarly, "at least one set" means one or more sets, and "multiple sets" means two or more sets. For example, if a point in a point cloud includes multiple sets of attribute data, it means that the point includes two or more sets of attribute data.

An introduction for other technical terms involved in this disclosure is provided below:

1. Immersive Media

Figure 1A:
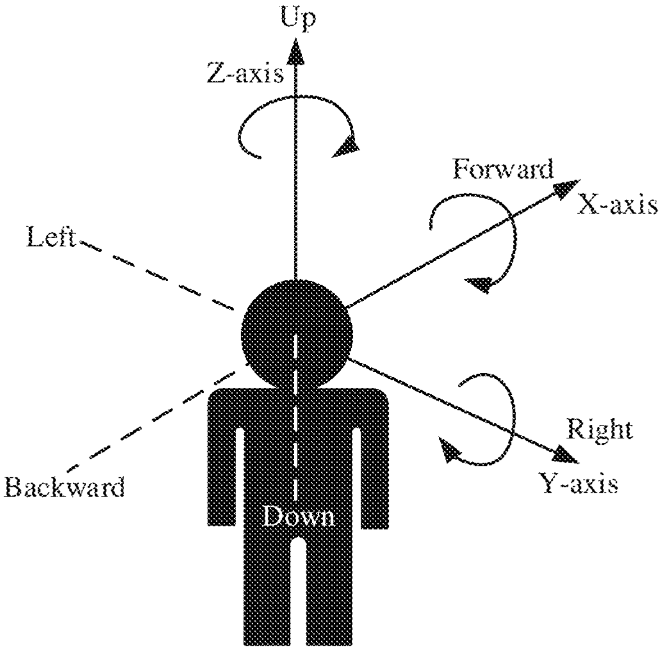
FIG. 1*a* is a schematic diagram of 6 degree of freedom (DoF) provided in an exemplary embodiment of this disclosure.
Figure 1B:
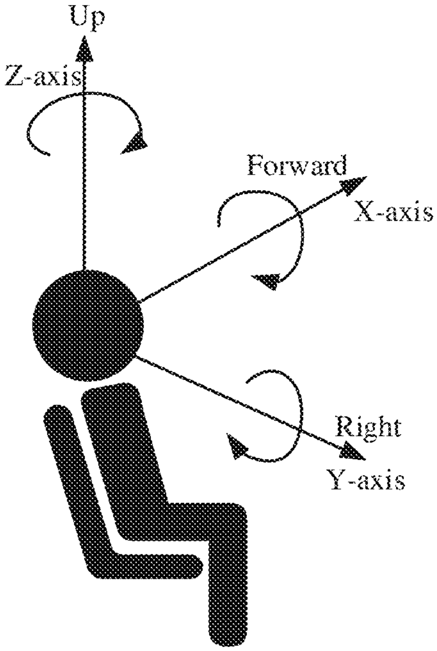
FIG. 1*b* is a schematic diagram of 3DoF provided in an exemplary embodiment of this disclosure.
Figure 1C:
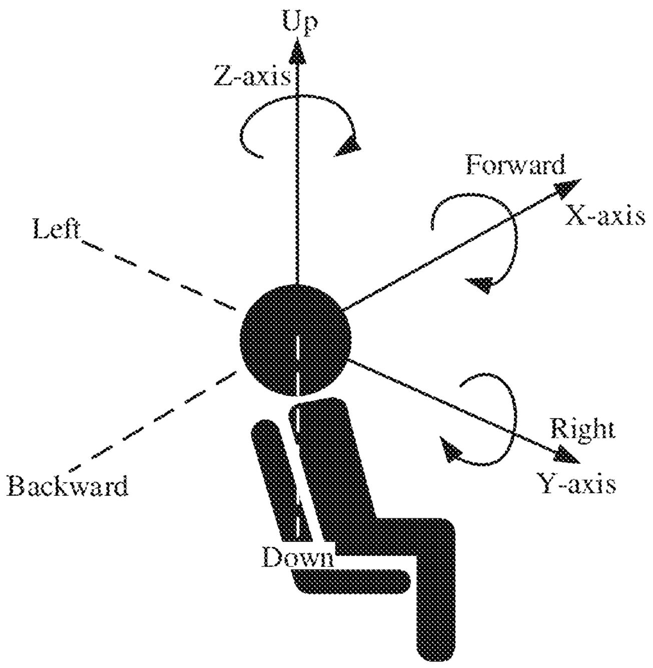
FIG. 1*c* is a schematic diagram of 3DoF+ provided in an exemplary embodiment of this disclosure.

Immersive media refers to media files that can provide immersive media contents, to allow a viewer immersed therein to gain sensory experiences such as visual and auditory experiences in the real world. Based on a viewer's degree of freedom when consuming the media contents, the immersive media may be classified into: 6 degree of freedom (DoF) immersive media, 3DoF immersive media, and 3DoF+immersive media. As shown in FIG. 1*a*, 6DoF means that the viewer of the immersive media may freely move along an X axis, a Y axis, and a Z axis, i.e., the viewer of the immersive media may freely move around in 3-dimension (3D) 360-degree virtual reality (VR) contents. Similar to 6DoF, there are also 3DoF and 3DoF+ production technologies. FIG. 1*b* is a schematic diagram of 3DoF provided in an embodiment of this disclosure. As shown in FIG. 1*b*, 3DoF means that the viewer of the immersive media is fixed at a center point of a 3D space, and a head of the viewer of the immersive media turns along the X axis, the Y axis, and the Z axis to view images provided by the media contents. FIG. 1*c* is a schematic diagram of 3DoF+ provided in an embodiment of this disclosure. As shown in FIG. 1*c*, 3DoF+ means that when a virtual scene provided by the immersive media has certain depth information, the head of the viewer of the immersive media may move in a limited space based on 3DoF to view images provided by the media contents.

2. Point Cloud

A point cloud refers to a set of randomly distributed discrete points in a space that express a spatial structure and surface attributes of a 3D object or scene. Each point in the point cloud includes at least geometric data, and the geometric data represents 3D position information of the point. Based on different application scenarios, the point in the point cloud may also include one or more sets of attribute data, each set of attribute data is configured for reflecting an attribute possessed by the point, and the attribute, for example, may be color, material, or other information. Typically, each point in the point cloud has the same number of sets of attribute data.

Point clouds may flexibly and conveniently express the spatial structure and surface attributes of a 3D object or scene, and thus are widely used in virtual reality (VR) games, computer aided design (CAD), geography information systems (GISs), autonomous navigation systems (ANSs), digital cultural heritage, free viewpoint broadcasting, 3D immersive remote presentation, 3D reconstruction of biological tissues and organs, and other scenarios.

Point clouds are obtained mainly by the following methods: computer generation, 3-Dimension (3D) laser scanning, 3D photogrammetry, or the like. Specifically, point clouds can be obtained by acquiring visual scenes in the real world through an acquiring device (e.g., a set of cameras or a camera device with multiple lenses and sensors). Point clouds (millions per second) of a static real-world 3D object or scene can be obtained through 3D laser scanning. Point clouds (ten millions per second) of a dynamic real-world 3D object or scene can be obtained through 3D photography. Moreover, in the field of medicine, point clouds of biological tissues and organs can be obtained through magnetic resonance imaging (MRI), computed tomography (CT), and electromagnetic positioning information. Furthermore, point clouds may also be directly generated by a computer based on a virtual 3D object and scene, for example, the computer can generate point clouds of the virtual 3D object and scene. With continuous accumulation of large-scale point cloud data, efficient storage, transmission, publishing, sharing, and standardization of point cloud data become crucial to point cloud application.

3. Point Cloud Media

Point cloud media is typical 6DoF immersive media. Point cloud media includes a frame sequence formed by one or more frames, and each frame is formed by geometric data and attribute data possessed by one or more points in a point cloud. The geometric data may also be referred to as 3D position information. The geometric data of a point in the point cloud refers to spatial coordinates (x, y, z) of the point, and the spatial coordinates may include coordinate values of the point in various coordinate axis directions of a 3D coordinate system, for example, a coordinate value x in an X-direction, a coordinate value y in a Y-direction, and a coordinate value z in a Z-direction. A point in the point cloud may include one or more sets of attribute data, and each set of attribute data is configured for reflecting a certain attribute possessed by the point. For example, a point in the point cloud has a set of color attribute data, and the color attribute data is configured for reflecting a color attribute (e.g., red, yellow, and the like) of the point. For example, a point in the point cloud has a set of reflectance attribute data, and the reflectance attribute data is configured for reflecting a laser reflection strength attribute of the point. When a point in the point cloud has multiple sets of attribute data, types of the multiple sets of attribute data may be the same or different. For example, a point in the point cloud may have a set of color attribute data and a set of reflectance attribute data. For example, a point in the point cloud may have two sets of color attribute data, and the two sets of color attribute data are configured for reflecting color attributes of the point at different times respectively.

4. Track

A track refers to a collection of media data in an encapsulation process of point cloud media. A track is formed by multiple samples with time series, and each sample corresponds to a frame of the point cloud media. Encapsulation modes of the point cloud media include a single-track mode and a multi-track mode. The single-track mode refers to encapsulating all point cloud data of the point cloud media into the same track, and in such a case, a media file of the point cloud media only contains one track (i.e., a single track obtained by single-track encapsulation). In the single track obtained by the single-track mode, a sample is a frame in the point cloud media, and one sample contains all the data of the corresponding frame (including geometric data and attribute data). The multi-track mode refers to encapsulating the point cloud data of the point cloud media into multiple different tracks, and in such a case, the media file of the point cloud media may contain multiple tracks. Further, the multi-track mode includes a type-based multi-track mode and a Slice-based multi-track mode. A component type-based multi-track mode refers to encapsulating a type of data into one track. For example, when the point cloud media contains a set of geometric data, a set of color attribute data, and a set of reflectance attribute data, the geometric data may be encapsulated into a geometric component track, the color attribute data may be encapsulated into a color attribute component track, and the reflectance attribute data may be encapsulated into a reflectance attribute component track. In any one track obtained in the type-based multi-track mode, a sample only contains partial data of one frame in the point cloud media. For example, a sample in the geometric component track contains geometric data of one frame in the point cloud media; and a sample in the color attribute component track contains a set of color attribute data of one frame in the point cloud media. Specifically, metadata information may also be a media type, and contained in the media file of the point cloud media in a form of a metadata track. The Slice-based multi-track mode encapsulation may obtain a base track and multiple slice tracks. The base track is configured for storing parameter data required for decoding the point cloud media, and the slice tracks are configured for storing the point cloud media. The base track contains one or more samples, and each sample contains parameter data required by a frame. The slice track contains one or more samples, and each sample contains point cloud media (including geometric data and/or attribute data) of one or more slices in a frame.

The point cloud media is present in the track in a form of a component after being encapsulated. For example, the attribute data in the point cloud media is present in the track in a form of an attribute component after being encapsulated, and the geometric data in the point cloud media is present in the track in a form of a geometric component after being encapsulated. The track mentioned in subsequent embodiments of this disclosure may be a single track formed by encapsulating a point cloud bitstream in the single-track mode; or any one track formed by encapsulating the point cloud bitstream in the type-based multi-track mode; or the base track formed by encapsulating the point cloud bitstream in the slice-based multi-track mode.

5. Sample and Subsample

A sample is an encapsulation unit in a process of media file encapsulation. A track includes multiple samples. For example, a video track may include multiple samples, and each sample is typically a video frame. In the embodiments of this disclosure, the media file of the point cloud media contains one or more tracks, and each sample in the tracks corresponds to one frame.

The sample may contain one or more slices (or strips). A slice represents a collection of syntactic elements (e.g., geometric slices and attribute slices) of data partially or completely encoded in a frame. Each slice may be represented by a subsample. There are at least two types of subsamples. One type of subsamples is based on a data type carried by a slice, and a subsample of such a type only contains one data type carried by the slice and related information, for example, a subsample only contains a geometric data type and geometric data related information. The other type of subsamples is based on a slice, and a subsample of such a type may contain all information of a slice, i.e., a geometric patch header, geometric data, an attribute patch header, and attribute data.

6. Sample Entry

A sample entry indicates metadata information related to all samples in a track. For example, in a sample entry of a video track, metadata information related to decoder initialization is typically contained.

7. Sample Group

Sample groups are obtained by grouping some samples in a track based on a specific rule. In the embodiments of this disclosure, cross-attribute dependency sample groups are involved, and the cross-attribute dependency sample groups are obtained by grouping samples in a track based on an encoding and decoding dependency relationship between attribute data. For example, samples to which all depended attribute data in a track belongs are grouped in one cross-attribute dependency sample group. Then, the cross-attribute dependency sample group may be configured for identifying the samples to which the depended attribute data in the track belongs, and any one sample in the cross-attribute dependency sample group contains or corresponds to the depended attribute data. For another example, samples to which all depending attribute data in a track belongs are grouped in one cross-attribute dependency sample group. Then, the cross-attribute dependency sample group may be configured for identifying the samples to which the depending attribute data in the track belongs. Any one sample in the cross-attribute dependency sample group contains or corresponds to the depending attribute data.

The aforementioned "contain" refers to: attribute data of frames contained in any one sample in a track obtained in the single-track mode or the type-based multi-track mode. The aforementioned "correspond" refers to: in the base track obtained in the slice-based multi-track mode, any one sample does not directly contain attribute data of frames, but contains parameter data required by the frames. But through the samples in the base track, the attribute data of the frames can be found in the corresponding slice track, and thus the samples in the cross-attribute dependency sample group in the base track can correspond to the depended attribute data or correspond to the depending attribute data.

8. Tile

A tile is also known as a hexahedral tile region in a boundary space region of a frame. A tile includes one or more slices, and no encoding and decoding dependency relationship exists between the tiles.

9. International Organization for Standardization (ISO) Based Media File Format (ISOBMFF)

An ISOBMFF is an encapsulation standard for media files, and a typical ISOBMFF file is an MP4 file.

10. Dynamic Adaptive Streaming over Hyper Text Transfer Protocol (HTTP) (DASH) DASH is an adaptive bit rate technology that enables high-quality streaming media to be delivered over the Internet through a traditional HTTP network server.

11. Media Presentation Description (MPD, media presentation description signaling in DASH):

MPD is configured for describing media segment information in a media file.

12. Representation

Representation refers to a combination of one or more media components in DASH, for example, a video file of a certain resolution may be considered as a Representation. In this disclosure, a video file of a certain temporal layer may be considered as a Representation.

13. Adaptation Sets Adaptation sets refer to collections of one or more video streams in DASH, and one adaptation set may contain multiple Representations.

14. Point Cloud Compression (PCC)

Point cloud compression (PCC) refers to a process of encoding the geometric data and attribute data of respective points in a point cloud to obtain a point cloud bitstream. PCC may include two main processes: geometric data encoding and attribute data encoding. In an encoding process, the geometric data of respective points in point cloud media may be encoded by Geometry-based Point Cloud Compression (G-PCC) to obtain a geometric bitstream; the attribute data of respective points in the point cloud media may be encoded by G-PCC to obtain an attribute bitstream; and the geometric bitstream and the attribute bitstream together form the point cloud bitstream of the point cloud media.

Specifically, when multiple types of attribute data are encoded, cross-attribute encoding may be allowed for the multiple types of attribute data. For example, if attribute data 1 is color attribute data, and attribute data 2 is reflectance attribute data, the attribute data 1 may be encoded first, and then the attribute data 2 is encoded.

Information involved in the encoding process may be saved in a data box for decoding on a decoding side, and the data box may be implemented through syntax shown in Table 1:

TABLE 1

<table>
<tr><th></th><th>Descriptor</th></tr>
<tr><td>attribute_header( ) {</td><td></td></tr>
<tr><td>for (attrIdx = 0;attrIdx<(maxNumAttributesMinus1 + 1);attrIdx ++){</td><td></td></tr>
<tr><td>attributePresentFlag[attrIdx]</td><td>u(1)</td></tr>
<tr><td>if(attributePresentFlag[attrIdx]){</td><td></td></tr>
<tr><td>outputBitDepthMinus1[attrIdx]</td><td>ue(v)</td></tr>
<tr><td>if (attrIdx== 0 || attrIdx == 1) {</td><td></td></tr>
<tr><td>maxNumOfNeighboursLog2Minus7[attrIdx]</td><td>u(2)</td></tr>
<tr><td>numOflevelOfDetail[attrIdx]</td><td>ue(v)</td></tr>
<tr><td>maxNumOfPredictNeighbours[attrIdx]</td><td>ue(v)</td></tr>
<tr><td>intraLodFlag[attrIdx]</td><td>u(1)</td></tr>
<tr><td>crossAttrTypePred</td><td>u(1)</td></tr>
<tr><td>if (crossAttrTypePred){</td><td></td></tr>
<tr><td>attrEncodeOrder</td><td>u(1)</td></tr>
<tr><td>crossAttrTypePredParam1</td><td>u(15)</td></tr>
<tr><td>crossAttrTypePredParam2</td><td>u(21)</td></tr>
<tr><td>}</td><td></td></tr>
<tr><td>}</td><td></td></tr>
<tr><td>if (attrIdx == 0) {</td><td></td></tr>
<tr><td>cross_component_Pred</td><td>u(1)</td></tr>
<tr><td>orderSwitch</td><td>u(1)</td></tr>
<tr><td>half_zero_runlength_enable</td><td>u(1)</td></tr>
<tr><td>chromaQpOffsetCb</td><td>se(v)</td></tr>
<tr><td>chromaQpOffsetCr</td><td>se(v)</td></tr>
<tr><td>colorReorderMode</td><td>ue(v)</td></tr>
<tr><td>colorGolombNum</td><td>ue(v)</td></tr>
<tr><td>}</td><td></td></tr>
<tr><td>if (attrIdx == 1) {</td><td></td></tr>
<tr><td>nearestPredParam1</td><td>ue(v)</td></tr>
<tr><td>nearestPredParam2</td><td>ue(v)</td></tr>
<tr><td>axisBias</td><td>ue(v)</td></tr>
<tr><td>refReorderMode</td><td>ue(v)</td></tr>
<tr><td>refGolombNum</td><td>ue(v)</td></tr>
<tr><td>}</td><td></td></tr>
<tr><td>}</td><td></td></tr>
<tr><td>}</td><td></td></tr>
<tr><td>transform</td><td>ue(v1)</td></tr>
<tr><td>if (transform &&</td><td></td></tr>
<tr><td>(attributePresentFlag[0]||attributePresentFlag[1])) {</td><td></td></tr>
<tr><td>maxNumofCoeff</td><td>ue(v)</td></tr>
<tr><td>coeffLengthControl</td><td>ue(v)</td></tr>
<tr><td>attrTransformQpDelta</td><td>ue(v)</td></tr>
<tr><td>initPredTransRatio</td><td>se(v)</td></tr>
<tr><td>transResLayer</td><td>u(1)</td></tr>
<tr><td>attrTransformNumPoints</td><td>ue(v)</td></tr>
<tr><td>maxTransNum</td><td>ue(v)</td></tr>
<tr><td>QpOffsetDC</td><td>se(v)</td></tr>
<tr><td>QpOffsetAC</td><td>se(v)</td></tr>
<tr><td>if ( attributePresentFlag[0]) {</td><td></td></tr>
<tr><td>chromaQpOffsetDC</td><td>se(v)</td></tr>
<tr><td>chromaQpOffsetAC</td><td>se(v)</td></tr>
</table>

TABLE 1-continued

| | Descriptor |
|---|---|
| } | |
| if ( attributePresentFlag[1]) { | |
| RefGroupPred | u(1) |
| } | |
| } | |
| byte_alignment( ) | |
| } | |

Semantics of the syntax in Table 1 are as follows:

Attribute present flag field (AttributePresentFlag [attrIdx]): the attribute present flag field is a binary variable. When a value of the attribute present flag field is a first set value (e.g., 1), the attribute present flag field is configured for representing that the point cloud bitstream contains attrIdx$^{th}$ attribute encoding. When the value of the attribute present flag field is a second set value (e.g., 0), the attribute present flag field is configured for representing that the point cloud bitstream does not contain the attrIdx$^{th}$ attribute encoding. AttrIdx is an integer in a range of 0 to 15. The meaning of the attribute present flag field may be interpreted in Table 2 below:

TABLE 2

| Mapping table of x attribute encoding | |
|---|---|
| Attribute index attr_idx | Attribute description |
| 0 | Color |
| 1 | Reflectance |
| 2 . . . 15 | Reserved |

Attribute transform algorithm flag field (Transform): the attribute transform algorithm flag field is a binary variable. The attribute transform algorithm flag field is configured for controlling whether to encode attribute data using wavelet transform. When a value of the attribute transform algorithm flag field is a first set value (e.g., 1), the attribute transform algorithm flag field is configured for controlling encoding of attribute data using wavelet transform. When the value of the attribute transform algorithm flag field is a second set value (e.g., 0), the attribute transform algorithm flag field is configured for controlling encoding of attribute data using a prediction method.

Attribute transform coefficient quantization parameter difference (attrTransformQpDelta): the attribute transform coefficient quantization parameter difference is an unsigned integer, and configured for representing a difference with an attribute residual quantization parameter. Attribute transform coefficient quantization parameter attrTransformQp-attrQuantParam (attribute quantization parameter)+attrTransformQpDelta.

Attribute transform number of points (attrTransformNumPoints): the attribute transform number of points is an unsigned integer, and configured for representing an attribute transform number of points, i.e., wavelet transforms using attrTransformNumPoints. When a value of attrTransformNumPoints is a second set value (e.g., 0), wavelet transform is performed using all points in a slice.

Maximum searched number of neighbour points logarithmic value minus 7 (maxNumOfNeighbour_log 2_minus7): the maximum searched number of neighbour points logarithmic value minus 7 is an unsigned integer, configured for exporting a variable maxNumOfNeighbour (maximum number of neighbour points), and represents the maximum number of encoded neighbours that can be used for searching to control a search range of neighbour candidate points and a number of hardware cached points in attribute prediction. maxNumOfNeighbour is calculated using the following formula:

$$\text{max}NumOfNeighbour = 2^{(maxNumOfNeighbour\_log2\_minus7+7)}\text{maxNumOfNeighbour\_log2\_minus7}.$$

Attribute residual secondary prediction field (Cross_component_pred): the attribute residual secondary prediction field is a binary variable, and configured for indicating whether to allow attribute residual secondary prediction. When a value of the attribute residual secondary prediction field is a first set value (e.g., 1), attribute residual secondary prediction is allowed. When the value of the attribute residual secondary prediction field is a second set value (e.g., 0), attribute residual secondary prediction is not allowed.

Residual encoding order switch field (orderSwitch): the residual encoding order switch field is a binary variable. When a value of the residual encoding order switch field is a first set value (e.g., 1), a residual encoding order is a UYV/GRB order. When the value of the residual encoding order switch field is a second set value (e.g., 0), the residual encoding order is an RGB/YUV order.

Half zero runlength enable field (half_zero_runlength_enable): the half zero runlength enable field is a binary variable. When a value of the half zero runlength enable field is a first set value, half zero runlength is used. When the value of the half zero runlength enable field is a second set value, half zero runlength is not used.

Chrominance channel Cb quantization parameter offset (chromaQpOffsetCb): the chrominance channel Cb quantization parameter offset is a signed integer, configured for controlling a Cb channel quantization parameter, and in a value range of −16 to 16. If chromaQpOffsetCb is not present in current attribute header information, a value of the chromaQpOffsetCb is 0, i.e., choramQpCb=Clip3 (minQP, maxQP, attribute_qp+chromaQpOffsetCb). A quantization parameter of a luminance channel lumaQp=attribute_qp, with a minimum supported quantization parameter being minQP=0, and a maximum supported quantization parameter being maxQP=63.

Chrominance channel Cr quantization parameter offset (chromaQpOffsetCr): the chrominance channel Cr quantization parameter offset is a signed integer, configured for controlling a Cr channel quantization parameter, and in a value range of −16 to 16. If chromaQpOffsetCr is not present in the current attribute header information, a value of the chromaQpOffsetCr is 0, i.e., choramQpCr=Clip3 (minQP, maxQP, attribute_qp+chromaQpOffsetCr). A quantization parameter of a luminance channel lumaQp=attribute_qp, with a minimum supported quantization parameter being minQP=0, and a maximum supported quantization parameter being maxQP=63.

Nearest neighbour point prediction parameter I (nearestPredParam1): the nearest neighbour point prediction parameter I is an unsigned integer, and configured for controlling a threshold of nearest neighbour point prediction.

Nearest neighbour point prediction parameter II (nearestPredParam2): the nearest neighbour point prediction parameter II is an unsigned integer, and configured for controlling a threshold of the nearest neighbour point prediction. The threshold is represented as attrQuantParam*nearestPredParam1+nearestPredParam1.

Spatial bias coefficient (axisBias): the spatial bias coefficient is an unsigned integer, and configured for controlling an offset in a Z-axis direction in calculation of an attribute predicted value.

Attribute output bit depth minus 1 (outputBitDepthMinus1): the attribute output bit depth minus 1 is an unsigned integer, configured for controlling an attribute output bit depth, and in a range of 0 to 15. outputBitDepth=outputBitDepthMinus1+1. If a syntactic element is not present in the point cloud bitstream, a default value is zero.

Number of level of detail (LoD) (numOflevelOfDetail): the number of LOD is an unsigned integer, and configured for controlling a number of levels of LOD divided during attribute prediction. The numOfLevelOfDetail in the bitstream complying with this part is not to exceed 32.

Maximum number of selected neighbour points for prediction (maxNumOfPredictNeighbours): the maximum number of selected neighbour points for prediction is an unsigned integer, and configured for limiting a number of neighbour points selected during attribute prediction. The maxNumOfPredictNeighbours in the bitstream complying with this part is not to exceed 16.

Intra LoD prediction flag field (intraLodFlag): the intra LoD prediction flag field is a binary variable, and configured for controlling whether to enable intra Lod prediction. When a value of the Intra LoD prediction flag field is a first preset value (e.g., 1), intra Lod prediction is enabled. When the value of the Intra LoD prediction flag field is a second preset value (e.g., 0), intra Lod prediction is disenabled.

Color reordering mode (colorReorderMode): the color reordering mode is an unsigned integer, and configured for representing a reordering mode selected for current color information. When a color reordering mode field is of a first preset value (e.g., 0), an original point cloud input order is used. When the color reordering mode field is of a second preset value (e.g., 1), a Hilbert reordering mode is used. When the color reordering mode field is of a third preset value (e.g., 2), a Morton reordering mode is used.

Reflectance reordering mode (refReorderMode): the reflectance reordering mode is an unsigned integer. When the Reflectance reordering mode is of a first preset value (e.g., 0), an original point cloud input order is used. When the Reflectance reordering mode is of a second preset value (e.g., 1), a Hilbert reordering mode is used. When the Reflectance reordering mode is of a third preset value (e.g., 2), a Morton reordering mode is used.

Maximum cache limitation parameter (maxNumofCoeff): the maximum cache restriction parameter is an unsigned integer, and configured for calculating a number of transform parameters limited to the maximum cache in attribute transform encoding.

Maximum delay limitation parameter (coeffLengthControl): the maximum delay limitation parameter is an unsigned integer, and configured for limiting a number of maximum delays of transform parameters in attribute transform encoding. The specific number of maximum delay points is calculated as maxNumofCoeff*coeffLengthControl.

Attribute encoding order field (attrEncodeOrder): the attribute encoding order field is a binary variable, and configured for controlling an encoding order of attributes when a point cloud contains multiple attribute types. When the attribute encoding order field is of a first set value (e.g., 0), color is encoded first, and then reflectance is encoded. When the attribute encoding order field is of a second set value (e.g., 1), reflectance is encoded first, and then color is encoded.

Cross-attribute type prediction field (CrossAttrTypePred): the cross-attribute type prediction field is a binary variable. When a value of the cross-attribute type prediction field is a first set value (e.g., 1), cross-attribute type prediction is allowed. When the value of the cross-attribute type prediction field is a second set value (e.g., 0), cross-attribute type prediction is not allowed.

Cross-attribute type prediction weight parameter 1 (crossAttrTypePredParam1): the cross-attribute type prediction weight parameter 1 is a 15-bit unsigned integer, and configured for controlling calculation of a weight parameter 1 for a geometric information distance and an attribute information distance in cross-attribute type prediction.

Cross-attribute type prediction weight parameter 2 (crossAttrTypePredParam2): the cross-attribute type prediction weight parameter 2 is a 21-bit unsigned integer, and configured for controlling calculation of a weight parameter 2 for a geometric information distance and an attribute information distance in cross-attribute type prediction.

Reflectance group prediction flag field (refGroupPred): the reflectance group prediction flag field is a binary variable, and configured for controlling whether to enable a reflectance group prediction mode for prediction transform. When the reflectance group prediction flag field is of a first set value (e.g., 1), group prediction is enabled. When the reflectance group prediction flag field is of a second set value (e.g., 0), group prediction is disenabled.

Initial prediction transform ratio (initPredTransRatio): the Initial prediction transform ratio is a signed integer, and configured for controlling an initial distance threshold configured for constructing a prediction transform tree in a multilayer transform algorithm for attribute compression (transform=1).

Transform residual layer flag field (transResLayer): the transform residual layer flag field is a binary variable, and configured for controlling whether to use attribute residual compensation in a multilayer transform algorithm for attribute compression (transform=1). When the transResLayer is of a first set value (e.g., 1), attribute residual compensation is used. When the transResLayer is of a second set value (e.g., 0), attribute residual compensation is not used.

Color index Golomb order number (ColorGolombNum): the color index Golomb order number is an unsigned integer, and configured for representing a $K^{th}$-order exponential Golomb order number K used when a current color prediction residual or transform coefficient is decoded, K=ColorGolombNum.

Reflectance index Golomb order number (RefGolombNum): the reflectance index Golomb order number is an unsigned integer, and configured for representing the $K^{th}$-order exponential Golomb order number K used when a current reflectance prediction residual or transform coefficient is decoded, K=ColorGolombNum.

Current to-be-decoded coefficient decoding mode flag field (coeffEncodeModeFlag): the current to-be-decoded coefficient decoding mode flag field is a binary variable. When the current to-be-decoded coefficient decoding mode flag field is of a first set value (e.g., 1), a 9.3.16.3 decoding point cloud attribute transform coefficient is used. When the current to-be-decoded coefficient decoding mode flag field is of a second set value (e.g., 0), a 9.3.12 decoding point cloud attribute transform coefficient is used.

15. Point Cloud Decoding

Point cloud decoding refers to a process of decoding a point cloud bitstream obtained by point cloud compression to reconstruct a point cloud. Specifically, point cloud decoding refers to a process of reconstructing geometric information and attribute data of respective points in a point cloud based on a geometric bitstream and an attribute bitstream in the point cloud bitstream. After a decoding side obtains the point cloud bitstream, for the geometric bitstream, entropy decoding is first performed to obtain quantized geometric information of respective points in the point cloud, and then, the quantized geometric information is inversely quantized to reconstruct the geometric information of the respective points in the point cloud. For the attribute bitstream, entropy decoding is first performed to obtain quantized prediction residual information or quantized transform coefficients of respective points in the point cloud. Then, the quantized prediction residual information is inversely quantized to obtain reconstructed residual information, the quantized transform coefficients are inversely quantized to obtain reconstructed transform coefficients, the reconstructed transform coefficients are inversely transformed to obtain the reconstructed residual information, and the attribute data of the respective points in the point cloud may be reconstructed based on the reconstructed residual information of the respective points in the point cloud. The point cloud is reconstructed by enabling the reconstructed attribute data of the respective points in the point cloud to correspond to the reconstructed geometric data one by one in order.

Based on the above description, this disclosure provides a data processing solution for point cloud media, and a general principle of the data processing solution is as follows: On an encoding side, corresponding cross-attribute dependency indication information may be generated based on an encoding and decoding dependency relationship between attribute data in a point cloud bitstream in an encoding process; the cross-attribute dependency indication information may be encapsulated in a media file of point cloud media; and the cross-attribute dependency indication information indicates the encoding and decoding dependency relationship between the attribute data in the point cloud bitstream. On a decoding side, the point cloud bitstream may be decoded based on the cross-attribute dependency indication information to present the point cloud media. In the data processing solution, the encoding and decoding dependency relationship between the attribute data in the point cloud bitstream may be indicated by the cross-attribute dependency indication information in the media file of the point cloud media. Based on the indication, transmission, decoding, and presentation of the point cloud media are guided, partial transmission and partial decoding at the decoding side are supported, and utilization of network bandwidths and computing resources of the decoding side is optimized.

The attribute data having the encoding and decoding dependency relationship may be divided into depending attribute data and depended attribute data based on the encoding and decoding dependency relationship. As the name implies, the depending attribute data refers to attribute data an encoding and decoding process of which needs to depend on other data; and the depended attribute data refers to data on which other data depends. For example, if an encoding and decoding process of attribute data 1 (Attr1) needs to depend on attribute data 2 (Attr2), the attribute data 1 (Attr1) and the attribute data 2 (Attr2) have the encoding and decoding dependency relationship, the attribute data 1 (Attr1) is called the depending attribute data, and the attribute data 2 (Attr2) is called the depended attribute data.

The data processing solution for point cloud media provided in the embodiments of this disclosure may also be combined with an Internet of Vehicles technology. Specifically, the data processing solution for point cloud media can acquire buildings, traffic signs, or the like in the environment, and construct a point cloud map in a vehicle for positioning, or use the point cloud map to achieve automatic navigation.

Figure 2A:
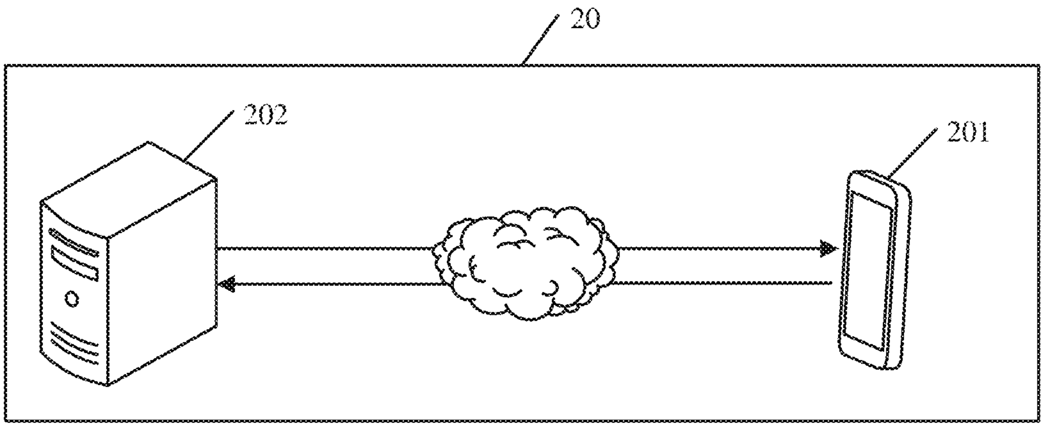
FIG. 2*a* is an architecture diagram of a data processing system for point cloud media provided in an exemplary embodiment of this disclosure.

Based on the above description, a data processing system for point cloud media provided in embodiments of this disclosure is introduced below in conjunction with FIG. 2*a*. As shown in FIG. 2*a*, a data processing system 20 for point cloud media may include a content production device 201 and a media processing device 202. The content production device 201 is located on an encoding side of the point cloud media, and the content production device 201 may be a terminal device or a server. The media processing device 202 is located on a decoding side of the point cloud media, and the media processing device 202 may be a terminal device or a server. Communication connection may be established between the content production device 201 and the media processing device 202. The terminal may be, but not limited to, a smartphone, a tablet computer, a laptop computer, a desktop computer, a smart speaker, a smartwatch, an on board terminal, a smart television, or the like. The server may be an independent physical server, or a server cluster or distributed system including multiple physical servers, or a cloud server that provides basic cloud computing service such as cloud service, cloud database, cloud computing, cloud function, cloud storage, network service, cloud communication, middleware service, domain name service, security service, a content delivery network (CDN), as well as a big data and artificial intelligence platform.

In one embodiment, a specific process of the content production device 201 and the media processing device 202 performing data processing of the point cloud media is as follows: The content production device 201 mainly includes the following data processing processes: (1) point cloud media obtaining; and (2) point cloud data encoding and file encapsulating. The media processing device 201 mainly includes the following data processing processes: (3) file decapsulating and decoding of point cloud data; and (4) point cloud data rendering.

In addition, a transmission process of the point cloud media is involved between the content production device 201 and the media processing device 202, and the transmission process may be based on various transmission protocols (or transmission signaling), including but are not limited to: a Dynamic Adaptive Streaming over Hyper Text Transfer Protocol (HTTP) (DASH) protocol, an HTTP Live Streaming (HLS) Protocol, a Smart Media Transport Protocol (SMTP), a Transmission Control Protocol (TCP), or the like.

A detailed description of the data processing processes of the point cloud media is provided below:

(1) Point Cloud Media Obtaining.

The content production device 201 may obtain the point cloud media, and the point cloud media may be obtained by scene capture or generated by a device. The point cloud media obtained by scene capture refers to point cloud media obtained by acquiring real-world visual scenes through a capture device associated with the content production device 201. The capture device is configured to provide a point cloud media obtaining service for the content production device 201. The capture device may include, but is not limited to any one of: camera devices, sensing devices, and scanning devices. The camera devices may include ordinary cameras, stereo cameras, light field cameras, or the like. The sensing devices may include laser devices, radar devices, or the like. The scanning devices may include 3D laser scanning devices or the like. The capture device associated with the content production device 201 may refer to a hardware component arranged in the content production device 201, for example, the capture device is a camera or a sensor on a terminal. The capture device associated with the content production device may also refer to a hardware apparatus connected with the content production device 201, such as a camera connected with the content production device 201. The point cloud media generated by a device refers to point cloud media generated by the content production device 201 based on virtual objects (e.g., virtual 3D objects and virtual 3D scenes obtained through 3D modeling).

(2) Point Cloud Media Encoding and File Encapsulating.

The content production device 201 may encode the geometric data and the attribute data in the point cloud media by point cloud compression, to obtain a point cloud bitstream (including a geometric bitstream and an attribute bitstream encoded). In one embodiment, when the attribute data in the point cloud media is encoded, cross-attribute encoding may be performed on multiple types of attribute data. For example, in the point cloud media, attribute data 1 is a set of color attribute data, and attribute data 2 is a set of reflectance attribute data, the attribute data 1 may be encoded first, and then the attribute data 2 is encoded in a cross-attribute encoding process.

After the point cloud bitstream is obtained, cross-attribute dependency indication information may be generated based on an encoding and decoding dependency relationship between the attribute data in the point cloud bitstream, and the cross-attribute dependency indication information and the point cloud bitstream may be encapsulated to obtain a media file of the point cloud media. In the encapsulation process, the point cloud bitstream may be encapsulated in a single-track mode or a multi-track mode. When the point cloud bitstream is encapsulated in the single-track mode, a single track is obtained. The single track may include one or more samples, and each sample may contain all the data, i.e., the geometric data and the attribute data, of a frame in the point cloud media. Further, the multi-track mode includes a type-based multi-track mode and a Slice-based multi-track mode. When the point cloud bitstream is encapsulated in the type-based multi-track mode, multiple tracks are obtained. Any one track may include one or more samples, and each sample may contain a type of data of a frame in the point cloud media. For example, a sample in a track 1 (a geometric component track) may contain the geometric data in the corresponding frame, and a sample in a track 2 (a color component track) may contain a set of color attribute data in the corresponding frame. When the point cloud bitstream is encapsulated in the Slice-based multi-track mode, multiple tracks (including a base track and multiple slice tracks) are obtained. The base track contains parameter data required for decoding the point cloud media. The point cloud data (including the geometric data and the attribute data) of a frame can be found from the corresponding slice track through a sample in the base track.

After the cross-attribute dependency indication information and the point cloud bitstream are encapsulated to obtain the media file, the media file may be transmitted to the media processing device 202, and thus the point cloud bitstream may be decoded in the media processing device 202 based on the cross-attribute dependency indication information. The cross-attribute dependency indication information may be set at a sample entry of a track in the media file, or at an entry of a cross-attribute dependency sample group contained in the track in the media file. The track may be the single track formed by encapsulating the point cloud bitstream in the single-track mode; or any one track formed by encapsulating the point cloud bitstream in the type-based multi-track mode; or the base track formed by encapsulating the point cloud bitstream in the slice-based multi-track mode. Unless otherwise specified, the tracks mentioned in subsequent embodiments of this disclosure have the same meaning as the tracks referred to here.

In one embodiment, when the point cloud media is transmitted through streaming, the cross-attribute dependency indication information may be contained in transmission signaling.

(3) File Decapsulating and Decoding of Point Cloud Media.

The media processing device 202 may obtain the media file of the point cloud media and corresponding media presentation description information through the content production device 201. The media file of the point cloud media and the media presentation description information are transmitted from the content production device 201 to the media processing device 202 through transmission signaling (e.g., DASH and SMT). The file decapsulating process of the media processing device 202 is inversed to the file encapsulating process of the media processing device 202. The media processing device 202 decapsulates media file resources according to a file format requirement of the point cloud media to obtain the point cloud bitstream. The decoding process of the media processing device 202 is inversed to the encoding process of the content production device 201. The media processing device 202 decodes the encoded bitstream to restore the point cloud media.

In the decoding process, the media processing device 202 may obtain the cross-attribute dependency indication information from the media file or the transmission signaling, and may obtain the media file of the point cloud media as needed based on the cross-attribute dependency indication information, and decode the point cloud media as needed.

(4) Point Cloud Media Rendering.

The media processing device 202 renders the decoded point cloud media based on metadata related to rendering and viewports in the media presentation description information, obtains a frame of the point cloud media, and presents the point cloud media based on a presentation time of the frame.

Figure 2B:
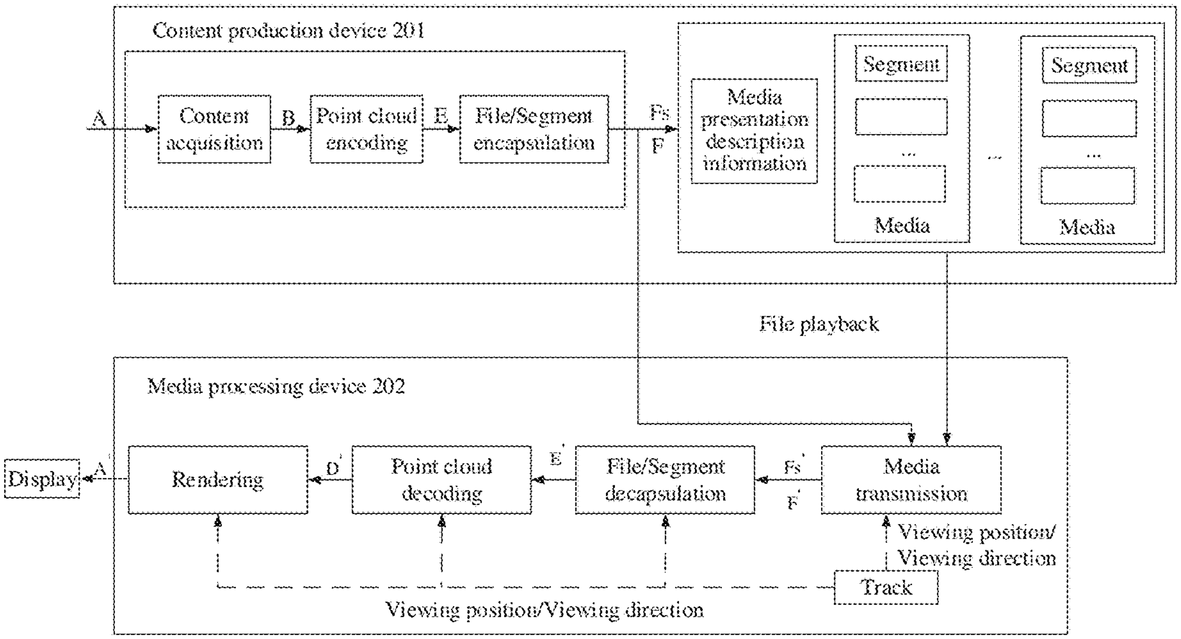
FIG. 2*b* is a flowchart of data processing of point cloud media provided in an exemplary embodiment of this disclosure.

In one embodiment, referring to FIG. 2*b*, at a content production device terminal, first, an acquiring device samples a visual scene A in the real world to obtain point cloud source data B of point cloud media corresponding to the visual scene in the real world. The point cloud source data B is a frame sequence including a large number of frames. Then, the obtained point cloud media is encoded to obtain a point cloud bitstream E (including the encoded geometric bitstream and attribute bitstream). Next, the point cloud bitstream E is encapsulated to obtain a media file corresponding to the point cloud media. Specifically, the content production device 201 combines one or more encoded bitstreams into a media file F for file playback, or into a sequence (FS) of an initial segment and a media segment for streaming transmission, based on a specific media container file format. The media container file format may refer to an ISO basic media file format as specified in the International Organization for Standardization (ISO)/International Electrotechnical Commission (IEC) 14496-12. In one implementation, the content production device also encapsulates the metadata into the media file or the sequence of the initial/media segments, and transmits the sequence of the initial/media segments to the media processing device 202 through transmission signaling (e.g., a DASH interface).

At a media processing device terminal, first, the media file transmitted by the content production device 201 is received, and the media file may include a media file F' for file playback, or a sequence Fs' of an initial segment and a media segment for streaming transmission. Then, the media file is decapsulated to obtain a point cloud bitstream E'. Based on the cross-attribute dependency indication information contained in the media file or the transmission signaling, the point cloud bitstream is decoded (i.e., the attribute data in the point cloud bitstream may be decoded based on the cross-attribute dependency indication information) to obtain point cloud media D'. In a specific implementation, the media processing device determines the media file or the media segment sequence required for presenting the point cloud media based on a viewing position/viewing direction of a current object, and decodes the media file or the media segment sequence required for presenting the point cloud media to obtain the point cloud media required for presentation. Finally, based on the viewing (viewport) direction of the current object, the decoded point cloud media is rendered to obtain a frame A' of the point cloud media, and the point cloud media is presented on a screen of a head mounted display or any other display device carried by the media processing device according to a presentation time of the frame. The viewing position/viewing direction of the current object is determined by a head following function and possibly a visual following function. In addition to rendering the point cloud media in the viewing position/viewing direction of the current object by using a renderer, an audio in the viewing (viewport) direction of the current object may also be decoded and optimized by using an audio decoder. In a viewport-based transmission process, the current viewing position and viewing direction are transmitted to a strategy module to determine the track to be received.

The data processing technology for point cloud media in this disclosure may be implemented based on a cloud technology, for example, a cloud server is used as the content production device. The cloud technology refers to a hosting technology that unifies hardware, software, network, and other resources in a wide area network or a local area network to achieve computation, storage, processing, and sharing of data.

In the embodiments of this disclosure, the content production device may obtain the point cloud media and encode the point cloud media to obtain the point cloud bitstream; then generate the cross-attribute dependency indication information based on the encoding and decoding dependency relationship between the attribute data in the point cloud bitstream; and encapsulate the cross-attribute dependency indication information and the point cloud bitstream to obtain the media file of the point cloud media. Then the media processing device may obtain the media file and decode the point cloud bitstream based on the cross-attribute dependency indication information contained in the media file. The cross-attribute dependency indication information is added to the media file of the point cloud media to indicate the encoding and decoding dependency relationship between the attribute data in the point cloud bitstream. Based on the indication, transmission, decoding, and presentation of the point cloud media are guided, partial transmission and partial decoding at the decoding terminal are supported, and utilization of the network bandwidths and the computing resources of the decoding terminal is optimized.

Figure 3:
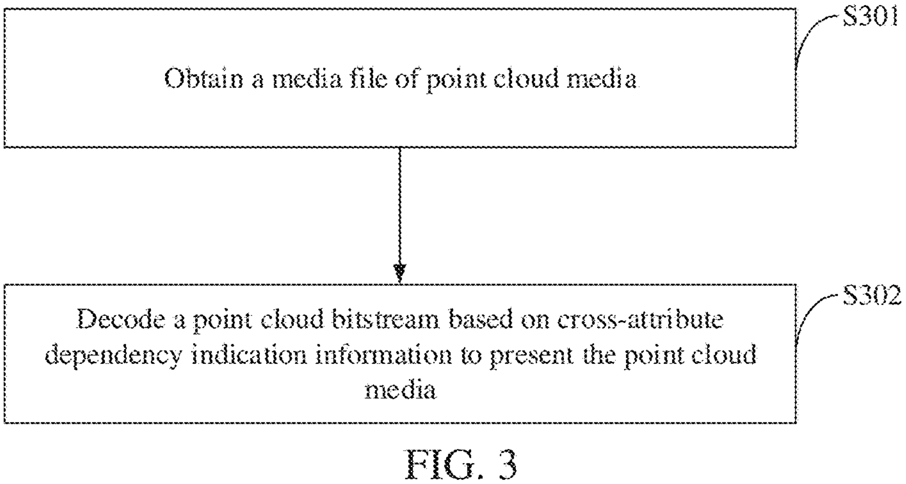
FIG. 3 is a schematic flowchart of a data processing method for point cloud media provided in an exemplary embodiment of this disclosure.

A related description of a data processing method for point cloud media provided in embodiments of this disclosure is provided below. Referring to FIG. 3, FIG. 3 is a schematic flowchart of a data processing method for point cloud media provided in embodiments of this disclosure. The data processing method for point cloud media may be executed by the media processing device in the data processing system for point cloud media, and the method includes the following S301-S302:

S301: Obtain a media file of point cloud media.

The media file includes a point cloud bitstream and cross-attribute dependency indication information of the point cloud media, the point cloud bitstream is obtained by encoding the point cloud media, and the cross-attribute dependency indication information is configured for indicating an encoding and decoding dependency relationship between attribute data in the point cloud bitstream. For example, the cross-attribute dependency indication information may be configured for indicating the encoding and decoding dependency relationship between attribute data 1 and attribute data 2 in the point cloud bitstream (e.g., the attribute data 1 depends on the attribute data 2 in an encoding and decoding process).

The cross-attribute dependency indication information may be set in the media file of the point cloud media in the following modes (1)-(6):

(1) The cross-attribute dependency indication information may be set in a sample entry of a track.

The media file includes a track, the track contains one or more samples, and each sample corresponds to one frame in the point cloud media. When the point cloud bitstream is encapsulated in a single-track mode, the track involved in the embodiments of this disclosure refers to a single track formed by encapsulating the point cloud bitstream in the single-track mode, and in such a case, one sample corresponds to all the data, i.e., geometric data and attribute data, of a frame in the point cloud media. A set of attribute data may be configured for reflecting a type of attribute of a point, and the type of attribute may be, but is not limited to color, reflectance, and material. When the point cloud bitstream is encapsulated in a type-based multi-track mode, the track involved in the embodiments of this disclosure is any one track formed by encapsulating the point cloud bitstream in a multi-track mode. In such a case, a sample in the track corresponds to a type of data of a frame in the point cloud media, for example, a sample in the track corresponds to the attribute data of a frame in the point cloud media. When the point cloud bitstream is encapsulated in a Slice-based multi-track mode, the track involved in the embodiments of this disclosure is a base track formed by encapsulating the point cloud bitstream in the slice-based multi-track mode.

The cross-attribute dependency indication information may be set in the sample entry of the track, and the cross-attribute dependency indication information may be configured for indicating that the encoding and decoding dependency relationship between the attribute data in the point cloud bitstream is consistent across all samples of the track. "Being consistent" refers to that the encoding and decoding dependency relationship between the attribute data included in all the samples in the track does not change. For example, all the samples contain a set of attribute data 1 of the same type and a set of attribute data 2 of the same type. If the cross-attribute dependency indication information is set in the sample entry of the track, the encoding and decoding dependency relationship between the attribute data in the point cloud bitstream is that the attribute data 1 depends on the attribute data 2 in all the samples of the track. For another example, each sample contains a set of color attribute data and a set of reflectance attribute data. If the cross-attribute dependency indication information is set in the sample entry of the track, the encoding and decoding dependency relationship between the attribute data in the point cloud bitstream is that the color attribute data depends on the reflectance attribute data in all the samples of the track.

The encoding and decoding dependency relationship between the attribute data may include: an encoding and decoding dependency relationship between the same type of attribute data, for example, color attribute data 1 depends on color attribute data 2, and reflectance attribute data 1 depends on reflectance attribute data 2. Alternatively, the encoding and decoding dependency relationship between the attribute data may include: an encoding and decoding dependency relationship between different types of attribute data, for example, the color attribute data depends on the reflectance attribute data.

(2) The cross-attribute dependency indication information may be set in a cross-attribute dependency sample group.

The media file includes a track, the track contains a cross-attribute dependency sample group, the cross-attribute dependency sample group contains one or more samples, and one sample corresponds to one frame in the point cloud media. In one embodiment, the cross-attribute dependency sample group may be configured for identifying samples to which depended attribute data belongs. The meaning of the cross-attribute dependency sample group is that for certain attribute data 1 (represented as Attr1), in multiple samples in the point cloud bitstream, there may be some samples on which samples to which other attribute data belongs depend, while there may be some samples on which the samples to which other attribute data belongs do not depend, and in such a case, the cross-attribute dependency sample group may be configured for distinguishing. Any one sample in the cross-attribute dependency sample group contains or corresponds to the depended attribute data. Then, the samples corresponding to the attribute data on which other attribute data depends may be grouped in one cross-attribute dependency sample group. For example, a sample 1 contains attribute data 2 on which attribute data 1 (i.e., other attribute data) depends, and a sample 2 also contains the attribute data 2 on which the attribute data 1 depends, then the sample 1 and the sample 2 may be grouped in one cross-attribute dependency sample group.

In another embodiment, the cross-attribute dependency sample group may be configured for identifying samples to which depending attribute data belongs. The meaning of the cross-attribute dependency sample group is that for certain attribute data 2 (represented as Attr2), in multiple samples in the point cloud bitstream, some samples may depend on samples to which other attribute data belongs, while some samples may not depend on the samples to which other attribute data belongs, and in such a case, the cross-attribute dependency sample group may be configured for distinguishing. Any one sample in the cross-attribute dependency sample group contains or corresponds to the depending attribute data. Then, the samples corresponding to the attribute data on which other attribute data depends may be grouped in one cross-attribute dependency sample group. For example, a sample 1 contains attribute data 1 depending on attribute data 2 (i.e., other attribute data), and a sample 2 contains attribute data 3 depending on the attribute data 2, then the sample 1 and the sample 2 may be grouped in one cross-attribute dependency sample group.

The cross-attribute dependency indication information may be set in an entry of the cross-attribute dependency sample group, and the cross-attribute dependency indication information is further configured for indicating that the encoding and decoding dependency relationship between the attribute data in the point cloud bitstream changes across all samples of the track. "Change" refers to that the encoding and decoding dependency relationship between the attribute data included in all the samples in the track may change or differ in different samples. For example, the track includes two samples, and all the samples may contain attribute data 1, attribute data 2, and attribute data 3. The encoding and decoding dependency relationship between the attribute data in the point cloud bitstream may be that the attribute data 1 depends on the attribute data 2 in a sample 1, while the encoding and decoding dependency relationship between the attribute data in the point cloud bitstream may be that the attribute data 2 depends on the attribute data 3 in a sample 2.

In the embodiments of this disclosure, the cross-attribute indication information may be represented as a cross-attribute dependency information data box. The cross-attribute indication information may indicate an encoding dependency relationship between different sets of attribute data in the point cloud bitstream.

In one implementation, the cross-attribute dependency indication information may be configured for indicating the encoding and decoding dependency relationship between two or more sets of attribute data in the point cloud bitstream. For example, if attribute data 3 and attribute data 4 depend on attribute data 1, the cross-attribute dependency indication information may be configured for indicating the encoding and decoding dependency relationship among the three sets of attribute data, i.e., the attribute data 1, the attribute data 3, and the attribute data 4. In one implementation, the cross-attribute dependency indication information may be represented as a cross-attribute dependency information data box, and the cross-attribute dependency information data box includes at least one of the following fields: a depended attribute data number field, a depended attribute data identifier field, a depending attribute data number field, and a depending attribute data identifier field. A data box type of the cross-attribute dependency information data box is 'cadi', and the cross-attribute dependency information data box is included in a sample entry, with a mandatory type of no, and a number of 0 or 1. Syntax of the cross-attribute dependency information data box may refer to Table 3:

TABLE 3

```
aligned(8) class CrossAttrDependencyInfoBox extends
FullBox('cadi', version = 0, 0) {
unsigned int(8) depended_attr_num;
for(i=0; i< depended_attr_num; i++){
```

TABLE 3-continued

```
unsigned int(8) depended_attr_id;
unsigned int(8) depending_attr_num;
for(j=0; j< depending_attr_num; j++){
unsigned int(8) depending_attr_id;
    }
  }
}
```

Semantics of the fields contained in the cross-attribute dependency information data box are as follows:

Depended attribute data number field (depended_attr_num): the depended attribute data number field is configured for indicating a number of sets of depended attribute data contained by or corresponding to a current track; or the depended attribute data number field is configured for indicating a number of sets of depended attribute data contained by or corresponding to a current sample. The number of sets of depended attribute data refers to a number of sets of attribute data on which other data depends. For example, if the current track or the current sample may contain two sets of attribute data on which attribute data 1 depends, there are two sets of attribute data on which the attribute data 1 depends in the current track or the current sample. The current track refers to a track being decoded in the media file, and the current sample refers to a sample being decoded in the current track.

Depending attribute data number field (depending_attr_num): the depending attribute data number field is configured for indicating a number of sets of other attribute data depending on current attribute data. The current attribute data refers to attribute data being decoded in the current sample.

Depended attribute data identifier field (depended_attr_id): the depended attribute data identifier field is configured for indicating an identifier of the depended attribute data, i.e., an identifier of attribute data on which other data depends.

Depending attribute data identifier field (depending_attr_id): the depending attribute data identifier field is configured for indicating an identifier of other attribute data depending on the current attribute data.

In another implementation, the cross-attribute dependency indication information is configured for indicating the encoding and decoding dependency relationship between any two sets of attribute data in the point cloud bitstream, i.e., the cross-attribute dependency indication information is configured for indicating the encoding and decoding dependency relationship between every two sets of attribute data in the point cloud bitstream. For example, attribute data 1 and attribute data 2 has an encoding and decoding dependency relationship, and attribute data 3 and attribute data 4 have an encoding and decoding dependency relationship.

In such a case, the cross-attribute dependency information data box contains the depended attribute data number field, the depending attribute data identifier field, and the depended attribute data identifier field. Syntax of the cross-attribute dependency information data box may refer to Table 4:

TABLE 4

```
aligned(8) class CrossAttrDependencyInfoBox extends
FullBox('cadi', version = 0, 0) {
unsigned int(8) depended_attr_num;
for(i=0; i< cross_attr_set_num; i++){
unsigned int(8) depended_attr_id;
```

TABLE 4-continued

```
unsigned int(8) depending_attr_id;
    }
}
```

Semantics of the fields contained in the cross-attribute dependency information data box are as follows:

Depended attribute data number field (depended_attr_num): the depended attribute data number field is configured for indicating the number of sets of depended attribute data contained by or corresponding to the current track; or the depended attribute data number field is configured for indicating the number of sets of depended attribute data contained by or corresponding to the current sample.

Depending attribute data identifier field (depending_attr_id): the depending attribute data identifier field is configured for indicating an identifier of depending attribute data in any two sets of attribute data.

The depended attribute data identifier field (depended_attr_id) is configured for indicating an identifier of depended attribute data in the any two sets attribute data.

In still another implementation, the point cloud bitstream only contains a first type of attribute data and a second type of attribute data. For example, the point cloud bitstream only contains reflectance attribute data (i.e., the first type of attribute data) and color attribute data (i.e., the second type of attribute data). In such a case, the cross-attribute dependency indication information is configured for indicating an encoding and decoding dependency relationship between the first type of attribute data and the second type of attribute data. The cross-attribute dependency information data box may contain a depended attribute data type field (depended_attr_type), and the attribute data type field is configured for indicating a type of depended attribute data. Syntax of the cross-attribute dependency information data box may refer to Table 5:

TABLE 5

```
aligned(8) class CrossAttrDependencyInfoBox extends
FullBox('cadi', version = 0, 0) {
unsigned int(8) depended_attr_type;
}
```

If the depended attribute data type field is of a first value (e.g., 0), the second type of attribute data depends on the first type of attribute data. If the depended attribute data type field is of a second value (e.g., 1), the first type of attribute data depends on the second type of attribute data. The first value and the second value may be set according to requirements, for example, the first value may be set to 1, and the second data may be set to 0, which is not limited in this disclosure.

(3) The cross-attribute dependency indication information may be set in a track group.

In one embodiment, a dependency relationship between tracks may be established based on the attribute data having the encoding and decoding dependency relationship in the point cloud bitstream. The media file may include one or more attribute component tracks, and the attribute data having the encoding and decoding dependency relationship in the point cloud bitstream may be in different attribute component tracks. For example, if the attribute data having the encoding and decoding dependency relationship in the point cloud bitstream includes color attribute data and reflectance attribute data, the color attribute data may be in one attribute component track, and the reflectance attribute data may be in another attribute component track. In such a case, an association relationship between different attribute component tracks may be represented by the track group, and the association relationship here may be understood as the encoding and decoding dependency relationship.

The media file contains a track group type data box, and the track group type data box may be configured for indicating the attribute component track to which the attribute data having the encoding and decoding dependency relationship in the point cloud bitstream belongs. The cross-attribute dependency indication information may be set in the track group type data box, and the cross-attribute dependency indication information may be represented as a cross-attribute dependency information data box (CrossAttrDependencyInfoBox). Syntax of the track group type data box (TrackGroupTypeBox) is shown in Table 6.

TABLE 6

```
aligned(8) class CrossAttrGroupBox extends
TrackGroupTypeBox('catg') {
    // track_group_id is inherited from TrackGroupTypeBox;
    CrossAttrDependencyInfoBox;
}
```

(4) The cross-attribute dependency indication information may be a track identifier, and the track identifier may be set in the attribute component track to which the depending attribute data belongs.

The media file includes one or more attribute component tracks, and the attribute data having the encoding and decoding dependency relationship in the point cloud bitstream is in different attribute component tracks. The media file contains a track reference type data box. The track reference type data box includes the track identifier, and the track identifier is configured for indicating the attribute component track to which the depended attribute data in the attribute data having the encoding and decoding dependency relationship belongs. The track reference type data box is set in the attribute component track to which the depending attribute data in the attribute data having the encoding and decoding dependency relationship belongs.

In one implementation, the track identifier may indicate a track identifier of the attribute component track to which the depended attribute data belongs, and the attribute component track to which the depended attribute data belongs refers to an attribute component track to which attribute data on which other attribute data depends belongs. For example, attribute data 1 and attribute data 2 have an encoding and decoding dependency relationship, the attribute data 2 depends on the attribute data 1, and the attribute data 1 and the attribute data 2 are in different attribute component tracks respectively. In such a case, the track reference type data box is set in the attribute component track to which the attribute data 2 belongs, and the track identifier is configured for indicating the attribute component track to which the depended attribute data 1 belongs. The track reference type data box is TrackReference TypeBox, and a 'cadr' type track identifier is added to the track reference type data box. If a current attribute component track contains the track identifier, at least one sample in the current attribute component track depends on at least one sample in the attribute component track indicated by the track identifier during decoding.

In another implementation, the track identifier is configured for indicating the attribute component track to which the depending attribute data in the attribute data having the encoding and decoding dependency relationship belongs. The track reference type data box is set in the attribute component track to which the depended attribute data in the attribute data having the encoding and decoding dependency relationship belongs. If the current attribute component track contains the track identifier, at least one sample in the attribute component track indicated by the track identifier depends on at least one sample in the current attribute component track. The current attribute component track refers to an attribute component track being decoded. For example, attribute data 1 and attribute data 2 have an encoding and decoding dependency relationship, the attribute data 2 depends on the attribute data 1, and the attribute data 1 and the attribute data 2 are in different attribute component tracks respectively. In such a case, the track reference type data box is set in the attribute component track to which the attribute data 1 belongs, and the track identifier is configured for indicating the attribute component track to which the depended attribute data 2 belongs. The track reference type data box is TrackReferenceTypeBox, and a 'cadr' type track identifier is added to the track reference type data box. If the current attribute component track contains the track identifier, at least one sample in the attribute component track indicated by the track identifier depends on at least one sample in the current attribute component track.

(5) The cross-attribute dependency indication information may be set in a subsample information data box.

The media file includes a track, the track contains one or more samples, and each sample corresponds to one frame in the point cloud media. One sample is divided into one or more slices, and each slice is represented by one subsample. The cross-attribute dependency indication information is set in a subsample information data box. In such a case, the cross-attribute dependency indication information may be contained in the subsample information data box, and the cross-attribute dependency indication information contains a cross-attribute dependency flag field and an attribute data identifier field.

Specifically, when the point cloud bitstream is encapsulated, the subsample information data box may be used, and the subsample information data box may contain a flag field of subsample information data. A subsample may be defined based on a value of the flag field (flag) of the subsample information data. The flag field specifies a type of subsample information in the subsample information data box. If the flag field is of a first preset value (e.g., 0), the subsample is a subsample based on a data type carried by a slice. In such a case, one subsample only contains one data type and related data, for example, a subsample only contains a geometric data type and geometric data. If the flag field is of a second preset value (e.g., 1), the subsample is a subsample based on a slice. In such a case, one subsample only contains all related data of one slice, i.e., a geometric patch header, geometric data, an attribute patch header, and attribute data. Certainly, other flag values may be reserved for the flag field.

In such a case, the definition of a codec_specific_parameters (coder-decoder specific specification) field of the subsample information data box may be as shown in Table 7:

TABLE 7

```
if(flags == 0){
    unsined int(8) payloadType;
        if(payloadType==0){
            unsigned int(1) attribute_present_flag[0];
```

TABLE 7-continued

```
            unsigned int(1) attribute_present_flag[1];
            unsigned int(1) cross_attr_depending_flag;
            unsigned int(8) attr_id;
              bit(13)                    reserved = 0;
        }
        else
        bit(24)                          reserved = 0;
    }
    else if (flags == 1){
        unsigned int(1) slice_data;
        if(slice_data){
            unsigned int(24)             slice_id;
        bit(7)                           reserved = 0;
          }
        else
        bit(31)                          reserved = 0;
        }
```

The meanings of fields contained in the subsample information data box are as follows:

Payload type field (payloadType): the payload field indicates a data type in a slice contained in a subsample. If a value of the payload type field is of a first set value (e.g., 0), the data type in the slice contained in the subsample is attribute data. If the value of the payload type field is of a second set value (e.g., 1), the data type in the slice contained in the subsample is geometric data.

Attribute presentation flag field (attribute_present_flag): this field indicates whether the subsample contains color and/or reflectance attributes, and the definition of which may refer to Audio Video Coding Standard (AVS)-PCC. If a value of the attribute presentation flag field is of a first set value (e.g., 0), whether the subsample contains the color attribute is indicated. If the value of the attribute presentation flag field is of a second set value (e.g., 1), whether the subsample contains the reflectance attribute is indicated.

Slice data field (slice_data): this field indicates whether the subsample contains data of a slice. If a value of the slice data field is of a first set value (e.g., 1), the subsample contains geometric and/or attribute type data of the slice. If the value of the slice data field is of a second set value (e.g., 0), the subsample does not contain parameter information of the slice.

Slice identifier field (slice_id): this field indicates an identifier of a slice corresponding to the data contained in the subsample.

Cross-attribute dependency flag field (cross_attr_depending_flag): the cross-attribute dependency flag field may be configured for indicating whether current attribute data depends on other attribute data during decoding. If a value of the cross-attribute dependency flag field is of a first preset value (e.g., 1), the current attribute data depends on other attribute data during decoding. If the value of the cross-attribute dependency flag field is of a second preset value (e.g., 0), the current attribute data does not depend on other attribute data during decoding.

Attribute identifier field (attr_id): this field is configured for indicating an identifier of the current attribute data. The current attribute data refers to attribute data in a subsample being decoded in the media file.

In the embodiments of this disclosure, the media file may further include a component information data box, and the component information data box contains a type of a component in the track. If the type of the component is attribute data, the component information data box further includes an attribute identifier field. The attribute identifier field is configured for indicating an identifier of current attribute data, and the current attribute data refers to attribute data being decoded. Syntax of the component information data box may refer to Table 8:

TABLE 8

```
aligned(8) class AVSPCCComponentInfoBox   extends
FullBox('acif', version = 0, 0) {
      unsigned int(8) avs_pcc_type;
      if(avs_pcc_type == 4) {
            bit(4)      reserved = 0;
unsigned int(4)   attr_num;
for(i=0; i<attr_num; i++){
         unsigned int(4) attr_type;
unsigned int(8) attr_id;
        }
     }
}
```

The definitions of fields contained in the component information data box are as follows:

Audio video coding standard point cloud compression type field (avs_pcc_type): this field indicates a type of a component in the track, and a value of this field is shown in Table 9. When the value of the avs_pcc_type is 4, it is determined that the component type in the track is attribute data.

TABLE 9

| Value of avs_pcc_type | Description |
|---|---|
| 1 | Reserved |
| 2 | Geometric data |
| 3 | Reserved |
| 4 | Attribute data |
| 5 . . . 31 | Reserved |

Attribute number field (attr_num): this field indicates a number of attribute components contained in the track.

Attribute type field (attr_type): this field indicates a type of attribute components contained in the track. If a value of the attribute type field is of a first value (e.g., 0), the type of the attribute components contained in the track is a color attribute type. If the value of the attribute type field is of a second value (e.g., 1), the type of the attribute components contained in the track is a reflectance attribute type.

Attribute identifier field (attr_id): this field may indicate an identifier of the current attribute data. The identifier of the current attribute data refers to an identifier of attribute data being decoded.

In one embodiment, the obtain a media file of point cloud media may include: receive a media file of the point cloud media transmitted by a content production device. Alternatively, when the point cloud media is transmitted through streaming, an implementation mode of obtaining the media file of the point cloud media may be as follows: transmission signaling of the point cloud media is obtained, and then the media file of the point cloud media is obtained based on the transmission signaling. The transmission signaling may be DASH signaling or SMT signaling. Based on the above, in the embodiments of this disclosure, the transmission signaling may also contain cross-attribute dependency indication information, and thus a point cloud bitstream can be decoded based on the cross-attribute dependency indication information.

In the embodiments of this disclosure, field extension may be performed in an encapsulation layer to support the implementation operations of the embodiments of this disclosure. When the point cloud media is transmitted through streaming, field extension may also be performed in the transmission signaling layer to support the embodiments of this disclosure.

(6) The cross-attribute dependency indication information may be set in transmission signaling.

a. When the transmission signaling is DASH signaling, the cross-attribute dependency indication information may refer to a cross-attribute dependency information descriptor in the DASH signaling.

The cross-attribute dependency information descriptor may be configured for indicating the encoding and decoding dependency relationship between the attribute data in the point cloud bitstream, or indicating a dependency relationship between different attribute data during cross-attribute encoding of the point cloud media. The cross-attribute dependency information descriptor (CrossAttrDependencyInfo descriptor) may be a supplemental property (SupplementalProperty) element, and an @schemeIdUri attribute in the cross-attribute dependency information descriptor is "urn:avs:ims:2022:apcc". The cross-attribute dependency information descriptor may be present in any hierarchy of an adaptation set hierarchy, a representation hierarchy, and a preselection hierarchy. When the cross-attribute dependency information descriptor is present in the adaptation set hierarchy, the cross-attribute dependency information descriptor is configured for describing all representations in the adaptation set hierarchy. When the cross-attribute dependency information descriptor is present in the representation hierarchy, the cross-attribute dependency information descriptor is configured for describing the representations in the corresponding representation hierarchy. When the cross-attribute dependency information descriptor is present in the preselection hierarchy, the cross-attribute dependency information descriptor is configured for describing point cloud media corresponding to the preselection hierarchy.

The cross-attribute dependency information descriptor includes at least one of the following elements: cross-attribute dependency information (CrossAttrDependencyInfo), a depended attribute data identifier element (@depended_attr_id), a depended attribute data type element (@depended_attr_type), a depending attribute data identifier element (@depending_attr_id), and a depending attribute data type element (depending_attr_type). The cross-attribute dependency information element may be configured for indicating the encoding and decoding dependency relationship between different attribute data during cross-attribute encoding of the point cloud bitstream. The depended attribute data identifier element is configured for indicating an identifier of the depended attribute data. The depending attribute data identifier element is configured for indicating an identifier of other attribute data depending on current attribute data. The depended attribute data type element is configured for indicating a type of the depended attribute data. The depending attribute data type element is configured for indicating a type of other attribute data depending on the current attribute data. The cross-attribute dependency information descriptor may be as shown in Table 10:

TABLE 10

Elements and attributes of geometric compression multi-attribute information (GPCCMultiAttrInsInfo) descriptor

| Elements and attributes of CrossAttrDependencyInfo descriptor | Use | Data type | Description |
|---|---|---|---|
| CrossAttrDependencyInfo | 0 . . . N | avs:ims:2022:apcc | The attribute of this element indicates a dependency relationship between different attribute data during cross-attribute encoding of the point cloud media. |
| CrossAttrDependencyInfo @depended__attr__id | M | xs:unsignedInt | Indicating an identifier of attribute data on which other attribute data depends. |
| CrossAttrDependencyInfo @depending__attr__id | M | xs:UIntVectorType | Indicating an identifier of other attribute data depending on current attribute data. |
| CrossAttrDependencyInfo @depended__attr__type | O | xs:unsignedInt | Indicating a type of attribute data on which other attribute data depends. |
| CrossAttrDependencyInfo @depending__attr__type | O | xs:unsignedInt | Indicating a type of other attribute data depending on the current attribute type data. |

where M: Mandatory, a mandatory field; CM: Conditional Mandatory; and O: Optional, and optional field.

In one embodiment, b, when the transmission signaling is DASH signaling, the cross-attribute dependency indication information may also refer to a dependency identifier field in the DASH signaling. The dependency identifier field may be @dependencyId in the DASH signaling. The dependency identifier field is configured for indicating the encoding and decoding dependency relationship between the attribute data in the point cloud bitstream. Specifically, in the attribute data having the encoding and decoding dependency relationship, the dependency identifier field may be set in a representation corresponding to the depending attribute data. The dependency identifier field is configured for indicating an identifier of a representation corresponding to the depended attribute data (i.e., attribute data on which other attribute data depends).

c. When the transmission signaling is SMT signaling, the cross-attribute dependency indication information refers to an asset group descriptor in the SMT signaling.

The asset group descriptor is defined in SMT and is configured for indicating an association relationship between assets in the same smart media transmission package (SMT Package). In SMT, there are originally only four types of relationships, i.e., dependency, composition, equivalence, and similarity, and the corresponding flags (flag fields) are a dependency flag field (dependency_flag), a composition flag field (composition_flag), an equivalence flag field (equivalence_flag), and a similarity flag field (similarity_flag) respectively. A new relationship type added to the SMT is a knowledge bitstream dependency type in an unaligned time period, and the corresponding flag is a library flag (library_flag). The relationship type is configured for describing a dependency relationship between a current asset and a knowledge bitstream asset in the unaligned time period. Syntax of the asset group descriptor may refer to Table 11:

TABLE 11

Syntax of asset group descriptor

| Syntax | Value | Bits | Type |
|---|---|---|---|
| Asset_group_descriptor( ) { | | | |
| descriptor_tag | | 16 | uimsbf |
| descriptor_length | | 16 | uimsbf |
| reserved | '1111' | 4 | |
| dependency_flag | | 1 | blsbf |
| composition_flag | | 1 | blsbf |
| equivalence_flag | | 1 | blsbf |
| similarity_flag | | 1 | blsbf |
| library_flag | | 1 | blsbf |
| if(dependency_flag) | | | |
| { | | | |
| num_dependencies | N1 | 8 | uimsbf |
| for(i = 0; i <N1; i++) { | | | |
| asset_id( ) | | | |
| } | | | |
| } | | | |
| if(composition_flag) | | | |
| { | | | |
| num_compositions | N2 | 8 | uimsbf |
| for(i = 0; i <N2; i++) { | | | |
| asset_id( ) | | | |
| } | | | |
| } | | | |
| if(equivalence_flag) | | | |
| { | | | |
| equivalence_selection_level | | 8 | uimsbf |
| num_equivalences | N3 | 8 | uimsbf |
| for(i = 0; i <N3; i++) { | | | |
| asset_id( ) | | | |
| equivalence_selection_level | | 8 | uimsbf |
| } | | | |
| } | | | |
| if(similarity_flag) | | | |
| { | | | |
| similarity_selection_level | | 8 | uimsbf |
| num_similarities | N4 | 8 | uimsbf |
| for(i = 0; i <N4; i++) { | | | |
| asset_id( ) | | | |
| similarity_selection_level | | 8 | uimsbf |
| } | | | |
| } | | | |
| if(library_flag) | | | |
| { | | | |
| num_libraries | N5 | 8 | uimsbf |
| for(i = 0; i <N5; i++) { | | | |
| asset_id( ) | | | |
| } | | | |
| } | | | |
| } | | | |

The meanings of fields included by the asset group descriptor are as follows:

Descriptor tag field (descriptor_tag): this field is 16 bits and configured for indicating a tag value of this type of descriptor.

Descriptor length field (descriptor_length): this field is 16 bits and indicates a byte length (calculated from the next field to the last field) of the descriptor.

Dependency flag field (dependency_flag): this field is 1 bit and indicates whether the dependency relationship needs to be added to the descriptor. If a value of the dependency flag field is of a first preset value (e.g., 0), the dependency relationship does not need to be added.

Composition flag field (composition_flag): this field is 1 bit and indicates whether the composition relationship needs to be added to the descriptor. If a value of the composition flag field is of a first preset value (e.g., 0), the composition relationship does not need to be added.

Equivalence flag field (equivalence_flag): this field is 1 bit and indicates whether the equivalence relationship needs to be added to the descriptor. If a value of the equivalence flag field is of a first preset value (e.g., 0), the equivalence relationship does not need to be added.

Similarity flag field (similarity_flag): this field is 1 bit and indicates whether the similarity relationship needs to be added to the descriptor. If a value of the similarity flag field is of a first preset value (e.g., 0), the similarity relationship does not need to be added.

Library flag field (library_flag): this field is 1 bit and indicates whether the knowledge bitstream dependency relationship in the unaligned time period needs to be added to the descriptor. If a value of the library flag field is of a first preset value (e.g., 0), the knowledge bitstream dependency relationship in the unaligned time period does not need to be added.

Number of dependencies field (num_dependencies): this field is 8 bits and indicates a number of assets on which an asset described by the descriptor depends.

Number of compositions field (num_compositions): this field is 8 bits and indicates a number of assets having the composition relationship with the asset described by the descriptor.

Equivalence selection level field (equivalence_selection_level): this field is 8 bits and indicates a presentation level of the corresponding asset in an equivalence relationship group. If the equivalence selection level field is of a first value ('0'), the asset is presented by default. When the default asset cannot be selected, an asset with a lower presentation level may be selected and presented as a substitute.

Number of equivalences field (num_equivalences): this field is 8 bits and indicates a number of assets having the equivalence relationship with the asset described by the descriptor.

Similarity selection level field (similarity_selection_level): this field is 8 bits and indicates a presentation level of the corresponding asset in a similarity relationship group. If the similarity selection level field is of a first value ('0'), the asset is presented by default. When the default asset cannot be selected, an asset with a lower presentation level may be selected and presented as a substitute.

Number of similarities field (num_similarities): this field is 8 bits, and indicates a number of assets having the similarity relationship with the asset described by the descriptor.

Number of libraries field (num_libraries): this field is 8 bits and indicates a number of knowledge bitstream assets in the unaligned time period on which the asset described by the descriptor depends.

asset identifier field (asset_id): this field indicates an identifier of an asset, i.e., asset_id in the asset group descriptor. When the asset group descriptor is configured for indicating the dependency relationship, the asset_id field indicates an identifier of an asset on which the asset described by the descriptor depends, and an asset identifier order provided in the descriptor corresponds to an internal encoding dependency hierarchy. When the asset group descriptor is configured for indicating the composition relationship, the asset_id field indicates an identifier of an asset having the composition relationship with the asset described by the descriptor. When the asset group descriptor is configured for indicating the equivalence relationship, the asset_id field indicates an identifier of an asset having the equivalence relationship with the asset described by the descriptor. When the asset group descriptor is configured for indicating the similarity relationship, the asset_id field indicates an identifier of an asset having the similarity relationship with the asset described by the descriptor. When the asset group descriptor is configured for indicating the knowledge bitstream dependency relationship in the unaligned time period, the asset_id field indicates an identifier of an asset having the knowledge bitstream dependency relationship in the unaligned time period with the asset described by the descriptor.

In one embodiment, for the above SMT signaling description, in the embodiments of this disclosure, the asset group descriptor in the SMT signaling may be configured for indicating the encoding and decoding dependency relationship between different attribute data. Specifically, the cross-attribute dependency indication information contains the asset group descriptor, and the asset group descriptor is configured for indicating the encoding and decoding dependency relationship between the attribute data in the point cloud bitstream.

In the attribute data having the encoding and decoding dependency relationship, the asset group descriptor (Asset_group_descriptor) is set in an asset corresponding to the depending attribute data. The asset group descriptor (Asset_group_descriptor) may include the dependency flag (dependency_flag), the number of dependencies field (num_dependencies), and the asset identifier field (asset_id). The dependency flag is set to a first preset value (e.g., 1). The number of dependencies field is configured for indicating a number of sets of other attribute data on which the depending attribute data depends during decoding. The asset identifier field is configured for indicating an asset identifier corresponding to the depended attribute data, i.e., the asset identifier field is configured for indicating an asset identifier corresponding to the attribute data on which other attribute data depends.

The cross-attribute dependency indication information may be set in one or a combination of more of the modes shown in (1)-(6) flexibly according to actual situations. For example, the cross-attribute dependency indication information may be set in the sample entry of the track, and when the track has a subsample, the cross-attribute dependency indication information may be further set in the subsample information data box.

S302: Decode the point cloud bitstream based on the cross-attribute dependency indication information to present the point cloud media.

A media processing device may obtain the cross-attribute dependency indication information from the media file or read the cross-attribute dependency indication information from the transmission signaling. When the cross-attribute dependency indication information is obtained from the media file, the media processing device may obtain the cross-attribute dependency indication information from a sample entry of a track, a cross-attribute dependency sample group, a subsample, or the like in the media file.

In one embodiment, an specific implementation of S302 may be as follows: the media processing device may determine attribute data on which current attribute data depends based on the encoding and decoding dependency relationship indicated by the cross-attribute dependency indication information, then decode the attribute data on which the current attribute data depends, and decode the current attribute data after decoding the attribute data on which the current attribute data depends.

The operation that the media processing device may determine attribute data on which current attribute data depends based on the encoding and decoding dependency relationship indicated by the cross-attribute dependency indication information may be as follows: a decoding order of the attribute data in the point cloud bitstream is determined based on the encoding and decoding dependency relationship indicated by the cross-attribute dependency indication information, and the attribute data on which the current attribute data depends on is determined from the decoding order.

When reading the cross-attribute dependency indication information from the transmission signaling, the media processing device determines the current to-be-decoded attribute data and the attribute data on which the current to-be-decoded attribute data depends based on the cross-attribute dependency indication information. In such a case, the depended attribute data needs to be decoded first and then the current to-be-decoded attribute data is decoded. Since the media file is transmitted through streaming, the media processing device needs to request a data stream (i.e., the media file) corresponding to the depended attribute data from the content production device, and then decode the depended attribute data first. Based on the cross-attribute dependency indication information, the data stream corresponding to the corresponding attribute data may be obtained according to requirements, and transmission guidance for the media file corresponding to the point cloud media may be achieved.

In the embodiments of this disclosure, the media processing device may obtain the media file of the point cloud media. The media file includes the point cloud bitstream and the cross-attribute dependency indication information of the point cloud media, and the cross-attribute dependency indication information is configured for indicating the encoding and decoding dependency relationship between the attribute data in the point cloud bitstream. The point cloud bitstream is decoded based on the cross-attribute dependency indication information to present the point cloud media. The cross-attribute dependency indication information is added to the media file of the point cloud media to indicate the encoding and decoding dependency relationship between the attribute data in the point cloud bitstream. Based on the indication, transmission, decoding, and presentation of the point cloud media are guided, partial transmission and partial decoding at the decoding terminal are supported, and utilization of the network bandwidths and the computing resources of the decoding terminal is optimized.

Figure 4:
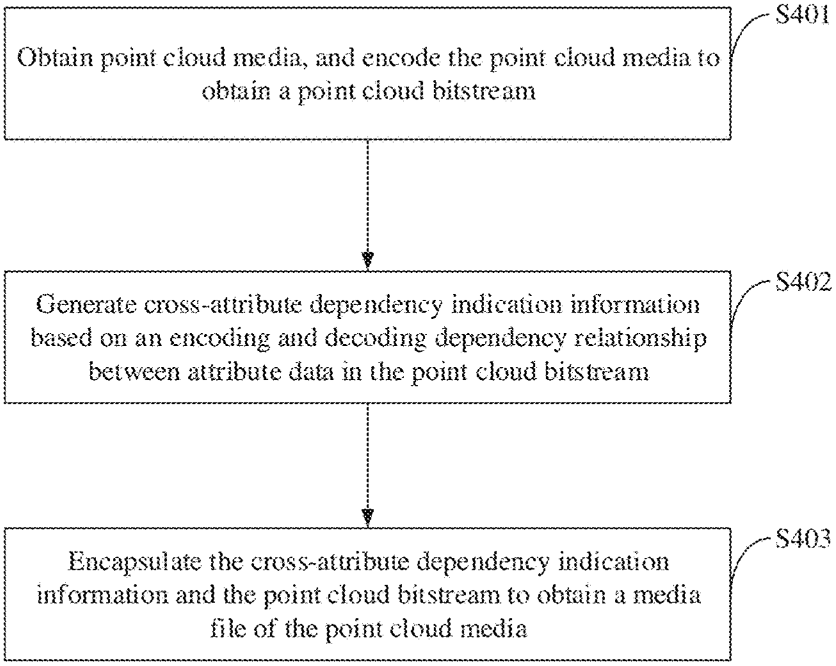
FIG. 4 is a schematic flowchart of a data processing method for point cloud media provided in another exemplary embodiment of this disclosure.

Referring to FIG. 4, FIG. 4 is a schematic flowchart of a data processing method for point cloud media provided in embodiments of this disclosure. The method may be executed by the content production device, and the data processing method for point cloud media as described in this embodiment may include the following S401-S403:

S401: Obtain point cloud media, and encode the point cloud media to obtain a point cloud bitstream.

Specific implementations for encoding the point cloud media may refer to the corresponding section above, and the descriptions thereof are omitted herein.

S402: Generate cross-attribute dependency indication information based on an encoding and decoding dependency relationship between attribute data in the point cloud bitstream.

The cross-attribute dependency indication information may be represented as a cross-attribute dependency information data box. The encoding and decoding dependency relationship between the attributes in the point cloud bitstream may include the following:

(1) An encoding and decoding dependency relationship between two or more sets of attribute data in the point cloud bitstream. For example, there is an encoding and decoding dependency relationship among three sets of attribute data in the point cloud bitstream, e.g., the three sets of attribute data are respectively attribute data 1, attribute data 2, and attribute data 3, where the attribute data 2 and the attribute data 3 depend on the attribute data 1. In such a case, the cross-attribute dependency indication information may indicate the encoding and decoding dependency relationship between two or more sets of attribute data in the point cloud bitstream. The cross-attribute dependency information data box may contain at least one of the following fields: a depended attribute data number field, a depended attribute data identifier field, a depending attribute data number field, and a depending attribute data identifier field. The depended attribute data number field is configured for indicating a number of sets of attribute data on which other attribute data depends contained by or corresponding to a current track; or the depended attribute data number field is configured for indicating a number of sets of depended attribute data contained by or corresponding to a current sample. The depended attribute data identifier field is configured for indicating an identifier of the depended attribute data. The depending attribute data number field is configured for indicating a number of sets of other attribute data depending on current attribute data. The depending attribute data identifier field is configured for indicating an identifier of other attribute data depending on the current attribute data. The current track refers to a track being encoded, the current sample refers to a sample being encoded in the current track, and the current attribute data refers to attribute data being encoded in the current sample.

(2) An encoding and decoding dependency relationship between any two sets of attribute data in the point cloud bitstream. For example, the any two sets of attribute data are attribute data 1 and attribute data 2, and the attribute data 2 depends on the attribute data 1. In such a case, the cross-attribute dependency indication information may indicate the encoding and decoding dependency relationship between any two sets of attribute data in the point cloud bitstream. The cross-attribute dependency information data box may contain the depended attribute data number field, the depending attribute data identifier field, and the depended attribute data identifier field. The depended attribute data number field is configured for indicating a number of sets of depended attribute data contained in a current track; or the depended attribute data number field is configured for indicating a number of sets of depended attribute data contained by or corresponding to a current sample. The depending attribute data identifier field is configured for indicating an identifier of depending attribute data in the any two sets attribute data. The depended attribute data identifier field is configured for indicating an identifier of depended attribute data in the any two sets of attribute data.

(3) The point cloud bitstream only contains a first type of attribute data and a second type of attribute data. For example, color attribute data depends on reflectance attribute data in the point cloud bitstream. In such a case, the cross-attribute dependency indication information is configured for indicating an encoding and decoding dependency relationship between the first type of attribute data and the second type of attribute data. The cross-attribute dependency information data box may contain a depended attribute data type field. The operation of generate cross-attribute dependency indication information based on an encoding and decoding dependency relationship between attribute data in the point cloud bitstream may include: if the second type of attribute data depends on the first type of attribute data, the depended attribute data type field is set to a first value (e.g., 0); and if the first type of attribute data depends on the second type of attribute data, the depended attribute data type field is set to a second value (e.g., 0).

S403: Encapsulate the cross-attribute dependency indication information and the point cloud bitstream to obtain a media file of the point cloud media.

The operation of encapsulate the cross-attribute dependency indication information and the point cloud bitstream to obtain media data of the point cloud media may be implemented in the following modes:

(1) The point cloud bitstream is encapsulated in a track, the track contains one or more samples, and each sample corresponds to one frame in the point cloud media. If the cross-attribute dependency indication information indicates that the encoding and decoding dependency relationship between the attribute data in the point cloud bitstream is consistent across all samples of the track, the cross-attribute dependency indication information may be set in a sample entry of the track to form the media file of the point cloud media.

(2) The point cloud bitstream is encapsulated in a track, the track contains one or more samples, and each sample corresponds to one frame in the point cloud media. A cross-attribute dependency sample group is formed in the track, and the cross-attribute dependency sample group contains one or more samples. Any one sample in the cross-attribute dependency sample group contains or corresponds to dependent attribute data; or any one sample in the cross-attribute dependency sample group contains or corresponds to depending attribute data. If the cross-attribute dependency indication information indicates that the encoding and decoding dependency relationship between the attribute data in the point cloud bitstream changes across all samples of the track, the cross-attribute dependency indication information is set in an entry of the cross-attribute dependency sample group to form the media file of the point cloud media.

(3) The attribute data having the encoding and decoding relationship in the point cloud bitstream is encapsulated into different attribute component tracks, each attribute component track may contain one or more samples, and each sample corresponds to one frame in the point cloud media. Each attribute component track may include a type of attribute data, or a set of attribute data, in the attribute data having the encoding and decoding relationship. Then, an association relationship between the different attribute component tracks is represented by a track group to form the media file of the point cloud media.

The media file may contain a track group type data box, and the track group type data box is configured for indicating the attribute component track to which the attribute data having the encoding and decoding dependency relationship in the point cloud bitstream belongs. The cross-attribute dependency information data box is set in the track group type data box.

(4) The attribute data having the encoding and decoding relationship in the point cloud bitstream is encapsulated into different attribute component tracks. Then, a track identifier corresponding to the attribute component track to which the depended attribute data in the attribute data having the encoding and decoding dependency relationship belongs is determined. In one implementation, the track identifier may be configured for indicating the attribute component track to which the depended attribute data in the attribute data having the encoding and decoding dependency relationship belongs, and then the track identifier may be set in a track reference type data box. Finally, the track reference type data box is set in the attribute component track to which the depending attribute data in the attribute data having the encoding and decoding dependency relationship belongs to form the media file of the point cloud media. If a current attribute component track contains the track identifier, at least one sample in the current attribute component track depends on at least one sample in the attribute component track indicated by the track identifier during encoding.

In another implementation, the track identifier is configured for indicating the attribute component track to which the depending attribute data in the attribute data having the encoding and decoding dependency relationship belongs. The track reference type data box is set in the attribute component track to which the depended attribute data in the attribute data having the encoding and decoding dependency relationship belongs. If the current attribute component track contains the track identifier, at least one sample in the attribute component track indicated by the track identifier depends on at least one sample in the current attribute component track. The current attribute component track refers to an attribute component track being decoded.

(5) The point cloud bitstream may be encapsulated in a track, the track contains one or more samples, and each sample corresponds to one frame in the point cloud media. Then, a sample is divided into one or more slices, and each slice is represented by a subsample. Next, the cross-attribute dependency indication information is set in a subsample to form the media file of the point cloud media.

When the point cloud bitstream is encapsulated, a subsample information data box (SubSampleInformationBox) is used, and thus the cross-attribute dependency indication information may be set in the subsample information data box.

In one embodiment, the cross-attribute dependency indication information contains a cross-attribute dependency flag field and an attribute data identifier field. The operation of generate cross-attribute dependency indication information based on an encoding and decoding dependency relationship between attribute data in the point cloud bitstream may include: if the encoding and decoding dependency relationship between the attribute data in the point cloud bitstream includes a condition that the current attribute data depends on other attribute data during encoding, the cross-attribute dependency flag field is set to a first preset value; and if the encoding and decoding dependency relationship between the attribute data in the point cloud bitstream includes a condition that the current attribute data does not depend on other attribute data during encoding, the cross-attribute dependency flag field may be set to a second preset value. The attribute data identifier field is configured for indicating an identifier of the current attribute data, and the current attribute data refers to attribute data being encoded.

In one embodiment, the media file further includes a component information data box, and the component information data box contains a type of a component in the track. If the type of the component is attribute data, the component information data box further includes an attribute identifier field. The attribute identifier field is configured for indicating the identifier of the current attribute data, and the current attribute data refers to attribute data being encoded.

After the cross-attribute dependency indication information and the point cloud bitstream are encapsulated to obtain the media file of the point cloud media, when the media file is transmitted through streaming, the transmission signaling contains the cross-attribute dependency indication information, and then the media file of the point cloud media is transmitted through the transmission signaling. The transmission signaling may be DASH signaling or SMT signaling.

(1) When the transmission signaling is the DASH signaling, the cross-attribute dependency indication information may refer to a cross-attribute dependency information descriptor in the DASH signaling or a dependency identifier field in the DASH signaling.

In one embodiment, the operation of generate cross-attribute dependency indication information based on an encoding and decoding dependency relationship between attribute data in the point cloud bitstream may include: a cross-attribute dependency information descriptor is generated based on the encoding and decoding dependency relationship between the attribute data in the point cloud bitstream.

The cross-attribute dependency information descriptor may be configured for indicating the encoding and decoding dependency relationship between the attribute data in the point cloud bitstream, or indicating a dependency relationship between different attribute data during cross-attribute encoding of the point cloud media. The cross-attribute dependency information descriptor (CrossAttrDependencyInfo descriptor) may be a supplemental property (SupplementalProperty) element, and an @schemeIdUri attribute in the cross-attribute dependency information descriptor is "urn:avs:ims:2022:apcc". The cross-attribute dependency information descriptor may be present in any hierarchy of an adaptation set hierarchy, a representation hierarchy, and a preselection hierarchy. When the cross-attribute dependency information descriptor is present in the adaptation set hierarchy, the cross-attribute dependency information descriptor is configured for describing all representations in the adaptation set hierarchy. When the cross-attribute dependency information descriptor is present in the representation hierarchy, the cross-attribute dependency information descriptor is configured for describing the representations in the corresponding representation hierarchy. When the cross-attribute dependency information descriptor is present in the preselection hierarchy, the cross-attribute dependency information descriptor is configured for describing point cloud media corresponding to the preselection hierarchy.

The cross-attribute dependency information descriptor includes at least one of the following elements: cross-attribute dependency information (CrossAttrDependencyInfo), a depended attribute data identifier element (@depended_attr_id), a depended attribute data type element (@depended_attr_type), a depending attribute data identifier element (@depending_attr_id), and a depending attribute data type element (depending_attr_type). The cross-attribute dependency information element may be configured for indicating the encoding and decoding dependency relationship between different attribute data during cross-attribute encoding of the point cloud bitstream. The depended attribute data identifier element is configured for indicating an identifier of the depended attribute data. The depending attribute data identifier element is configured for indicating an identifier of other attribute data depending on current attribute data. The depended attribute data type element is configured for indicating a type of the depended attribute data. The depending attribute data type element is configured for indicating a type of other attribute data depending on the current attribute data.

In another embodiment, the cross-attribute dependency indication information may refer to the dependency identifier field in the DASH signaling, and the dependency identifier field is configured for indicating the encoding and decoding dependency relationship between the attribute data in the point cloud bitstream. Specifically, in the attribute data having the encoding and decoding dependency relationship, the dependency identifier field is set in a representation corresponding to the depending attribute data. The dependency identifier field is configured for indicating an identifier of a representation corresponding to the depended attribute data.

(2) When the transmission signaling is the SMT signaling, the transmission signaling is the SMT signaling, and the cross-attribute dependency indication information refers to an asset group descriptor in the SMT signaling.

The operation of generate cross-attribute dependency indication information based on an encoding and decoding dependency relationship between attribute data in the point cloud bitstream may include: an asset group descriptor is generated based on the encoding and decoding dependency relationship between the attribute data in the point cloud bitstream.

In the attribute data having the encoding and decoding dependency relationship, the asset group descriptor is set in an asset corresponding to the depending attribute data. The asset group descriptor includes a dependency flag, a number of dependencies field, and an asset identifier field. The dependency flag is set to a first preset value. The number of dependencies field is configured for indicating a number of sets of other attribute data on which the depending attribute data depends during decoding. The asset identifier field is configured for indicating an asset identifier corresponding to the depended attribute data.

In the embodiments of this disclosure, the point cloud media is obtained and encoded to obtain the point cloud bitstream; the cross-attribute dependency indication information is generated based on the encoding and decoding dependency relationship between the attribute data in the point cloud bitstream; and the cross-attribute dependency indication information and the point cloud bitstream are encapsulated to obtain the media file of the point cloud media. The generation of the cross-attribute dependency indication information facilitates guidance for decoding of the point cloud bitstream.

A detailed description of the data processing method for point cloud media provided in this disclosure is provided below by two complete examples:

Embodiment 1: A Cross-Attribute Dependency Information Data Box (CrossAttrDependencyInfoBox) is Contained in a Sample Entry of a Track 1. A content production device may acquire point cloud media and encode the point cloud media to generate a point cloud bitstream.

2. When file encapsulation is performed on the point cloud bitstream, cross-attribute dependency indication information is generated based on an encoding and decoding dependency relationship of different attribute data in the point cloud bitstream during encoding and decoding. Then, file encapsulation is performed on the point cloud bitstream and the cross-attribute dependency indication information in a single-track mode to obtain a media file.

The media file contains a track (track1), and the track includes geometric data, color attribute data, and reflectance attribute data. The track includes multiple samples, and each sample may contain the geometric data, the color attribute data, and the reflectance attribute data. The cross-attribute dependency indication information (represented as a cross-attribute dependency information data box) is configured for indicating that the reflectance attribute data depends on the color attribute data during encoding and decoding, and the dependency relationship (i.e., that the reflectance attribute data depends on the color attribute data during encoding and decoding) remains unchanged across all samples. Then the cross-attribute dependency information data box may be set in a sample entry of the track. Each sample is divided into one or more slices, and each slice is represented by a subsample. The cross-attribute dependency indication information may also be set in a subsample information data box to form the media file of the point cloud media. The media file is as follows:

Track1:

CrossAttrDependencyInfoBox:

```
    { depended__attr__num = 1; depended__attr__id=100;
    depending__attr__num=1;
  depending__attr__id=200;}
    SubsampleInformationBox:
    Subsample1{cross__attr__depending__flag=0; attr__id=100;}
    Subsample2{cross__attr__depending__flag=1; attr__id=200;}
```

The CrossAttrDependencyInfoBox represents the cross-attribute dependency information data box. In the cross-attribute dependency information data box, depended_attr_num=1 indicates that the number of sets of attribute data (i.e., attribute data with an identifier 100) on which other attribute data (i.e. attribute data with an identifier 200) depends contained in a current track or a current sample is 1; depended_attr_id=100 indicates that the identifier of the attribute data on which other attribute data depends is 100; depending_attr_num=1 indicates that the number of sets of other attribute data depending on current attribute data is 1; and depending_attr_id=200 indicates that the identifier of the other attribute data depending on the current attribute data is 200.

The SubsampleInformationBox represents the subsample information data box. In the subsample information data box, for a subsample 1, cross_attr_depending_flag=0 indicates that the current attribute data does not depend on other attribute data during decoding, and attr_id=100 indicates that the identifier of the current attribute data is 100, i.e., the current attribute data in the subsample 1 may be independently decoded. For a subsample 2, cross_attr_depending_flag=1 indicates that the current attribute data depends on other attribute data during decoding, and attr_id=200 indicates that the identifier of the current attribute data is 200, i.e., the current attribute data in the subsample 2 depends on other attribute data (i.e. depends on the attribute data corresponding to attr_id=100) during decoding.

Only two examples of subsamples in a certain sample are provided here, and fields in other samples are similar.

3. The content production device may transmit the media file to a media processing device.

4. After receiving the media file, the media processing device may read the CrossAttrDependencyInfoBox information and the SubsampleInformationBox information from the sample entry of the track included in the media file, and learns from the CrossAttrDependencyInfoBox information and the SubsampleInformationBox information that the attribute data with attr_id=200 depends on the attribute data with attr_id=100 during decoding. In this case, the media file only includes one track, indicating that the point cloud bitstream is encapsulated in a single-track mode.

5. If the media processing device needs to partially decode different attribute data, the media processing device may determine, based on the encoding and decoding dependency relationship (i.e., that the attribute data with attr_id=200 depends on the attribute data with attr_id=100 during decoding), to decode the subsample corresponding to attr_id=100 in the sample first, and then decode the subsample corresponding to attr_id=200 in the sample when parsing the subsamples.

6. The media processing device may decode the subsample corresponding to attr_id=100 to obtain attribute data (i.e., point cloud media) in the subsample corresponding to attr_id=100, and then decode the subsample corresponding to attr_id=200 to obtain attribute data (i.e., point cloud media) in the subsample corresponding to attr_id=200.

7. The decoded point cloud media is rendered to present the point cloud media.

Embodiment 2: A CrossAttrDependencyInfoBox is Contained in a Cross-Attribute Dependency Sample Group 1. A content production device may acquire point cloud media and encode the point cloud media to generate a point cloud bitstream. When file encapsulation is performed on the point cloud bitstream, cross-attribute dependency indication information is generated based on an encoding and decoding dependency relationship between different attribute data in the point cloud bitstream during encoding and decoding. Then, file encapsulation is performed on the point cloud bitstream and the cross-attribute dependency indication information in a multi-track mode to obtain a media file.

Specifically, the point cloud media includes geometric data, color attribute data, and reflectance attribute data. When the point cloud bitstream is encapsulated in the multi-track mode, the geometric data, the color attribute data, and the reflectance attribute data may each be encapsulated in one track, and thus a geometric component track (Track1), an attribute component track (Track2) corresponding to the color attribute data, and an attribute data track (Track3) corresponding to the reflectance attribute data may be obtained. The generated cross-attribute dependency indication information indicates that the reflectance attribute data depends on the color attribute data in samples 1-100 (sample1-100) during encoding and decoding, and the reflectance attribute data does not depend on the color attribute data in samples 101-200 (sample101-200) (i.e., may be decoded independently) during encoding and decoding. Then the cross-attribute dependency indication information is set in the cross-attribute dependency sample group in the attribute track corresponding to the color attribute data, and the cross-attribute dependency indication information is represented as a cross-attribute dependency information data box. Then, when the color attribute data and the reflectance attribute data having the encoding and decoding dependency relationship are in different attribute component tracks, track identifiers may be adopted for associating the attribute component track corresponding to the color attribute data and the attribute component track corresponding to the reflectance attribute data. The track identifier of the attribute component track corresponding to the color attribute data may be set in a track reference type data box in the attribute component track corresponding to the color attribute data, and finally the following media file is formed:

Track1: geometric component track

Track2: attribute component track-color

A CrossAttrDependency InfoEntry sample group corresponds to sample1 to sample100, and the CrossAttrDependencyInfoEntry contains the following CrossAttrDependencyInfoBox information:

```
{depended__attr__num =1; depended__attr__id=100;
depending__attr__num=1;
depending__attr__id=200;}
```

The CrossAttrDependency InfoEntry sample group represents the cross-attribute dependency sample group. The samples 1-100 in the cross-attribute dependency sample group are all samples in which the reflectance attribute data depends on the color attribute data during encoding and decoding. The cross-attribute dependency sample group includes a cross-attribute dependency information data box (CrossAttrDependency InfoBox), where depended_attr_num=1 indicates that the number of sets of attribute data (i.e., the color attribute data) on which other attribute data (i.e., the reflectance attribute data) depends contained in a current sample is 1; depended_attr_id=100 indicates that the identifier of the attribute data on which other attribute data depends is 100; depending_attr_num=1 indicates that the number of sets of other attribute data depending on the current attribute data is 1; and depending_attr_id=200 indicates that the identifier of other attribute data depending on the current attribute data is 200.

Track3: attribute component track-reflectance

The TrackReferenceBox of the track contains a TrackReferenceTypeBox of type 'cadr', and a track identity (ID) in the TrackReferenceTypeBox is an ID of a Track2, and indicates that a current track (Track3) depends on the Track2 during decoding.

The TrackReferenceBox represents a track reference data box, the TrackReference TypeBox represents the track reference type data box, and a track identifier included in the track reference type data box is the ID of the Track2 (i.e., the track identifier of the Track 2).

2. The media file is transmitted through streaming. The track identifier in the track reference type data box may be read to determine the encoding and decoding dependency relationship between the track2 and the track3. The content production device may transmit the media file of the point cloud media to a media processing device through DASH signaling. In a signaling file, a dependency identifier field (dependencyId) in DASH may be adopted for indexing a representation corresponding to the track3 to a representation corresponding to the track2.

3. The media processing device receives the media file of the point cloud media transmitted through the DASH signaling, and may determine to-be-decoded attribute data and attribute data on which the to-be-decoded attribute data depends based on the encoding and decoding dependency relationship indicated in the DASH signaling. After the operation 2, the media processing device learns from the encoding and decoding dependency relationship indicated in the DASH signaling that the track2 and the track3 have an encoding and decoding dependency relationship. In such a case, when the reflectance attribute data needs to be presented, the representation corresponding to the track2 is to be obtained simultaneously.

4. After obtaining the representations corresponding to the track2 and the track3, by parsing the information in the cross-attribute dependency sample group CrossAttrDependencyInfoEntry, the media processing device may determine that the samples 1-100 are all samples in which the reflectance attribute data depends on the color attribute data, while the color attribute data and the reflectance attribute data in samples 101-200 may be independently decoded.

5. Based on the encoding and decoding dependency relationship indicated in the cross-attribute dependency information data box, when the samples 1-100 are decoded, firstly the samples 1-100 in the attribute component track corresponding to the color attribute data are decoded to obtain the color attribute data, and then the samples 1-100 in the attribute component track corresponding to the reflectance attribute data are decoded to obtain the reflectance attribute data. When the samples 101-200 are decoded, the attribute data in the corresponding attribute component track may be decoded according to requirements.

6. The decoded color attribute data and reflectance attribute data are rendered to present the point cloud media.

In the embodiments of this disclosure, the cross-attribute dependency indication information is added to the media file of the point cloud media to indicate the encoding and decoding dependency relationship between the attribute data in the point cloud bitstream. Based on the indication, transmission, decoding, and presentation of the point cloud media are guided, partial transmission and partial decoding at a decoding terminal are supported, and utilization of network bandwidths and computing resources of the decoding terminal is optimized.

Figure 5:
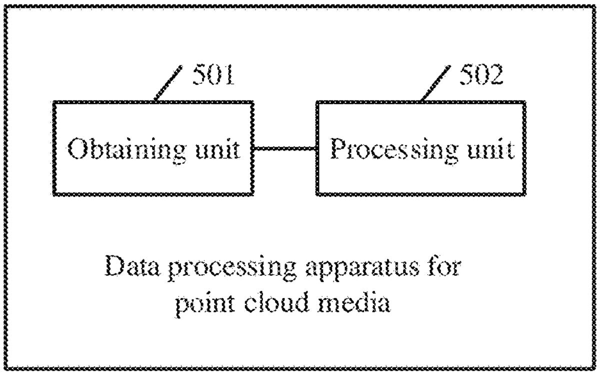
FIG. 5 is a schematic structural diagram of a data processing apparatus for point cloud media provided in an exemplary embodiment of this disclosure.

Referring to FIG. 5, FIG. 5 is a schematic structural diagram of a data processing apparatus for point cloud media provided in embodiments of this disclosure. The data processing apparatus for point cloud media may be set in a computer device provided in embodiments of this disclosure, and the computer device may be the media processing device mentioned in the aforementioned method embodiments. The data processing apparatus for point cloud media shown in FIG. 5 may be a computer program (including program code) running in a computer device, and the data processing apparatus for point cloud media may be configured to perform some or all of the operations in the method embodiment shown in FIG. 3. Referring to FIG. 5, the data processing apparatus for point cloud media may include the following units:

an obtaining unit 501, configured to obtain a media file of point cloud media, the media file including a point cloud bitstream and cross-attribute dependency indication information of the point cloud media, and the cross-attribute dependency indication information being configured for indicating an encoding and decoding dependency relationship between attribute data in the point cloud bitstream; and a processing unit 502, configured to decode the point cloud bitstream based on the cross-attribute dependency indication information to present the point cloud media.

The term "unit" (and other similar terms such as module, submodule, etc.) refers to computing software, firmware, hardware, and/or various combinations thereof. At a minimum, however, units are not to be interpreted as software that is not implemented on hardware, firmware, or recorded on a non-transitory processor readable recordable storage medium. Indeed "unit" is to be interpreted to include at least some physical, non-transitory hardware such as a part of a processor, circuitry, or computer. Two different units can share the same physical hardware (e.g., two different units can use the same processor and network interface). The units described herein can be combined, integrated, separated, and/or duplicated to support various applications. Also, a function described herein as being performed at a particular unit can be performed at one or more other units and/or by one or more other devices instead of or in addition to the function performed at the particular unit. Further, the units can be implemented across multiple devices and/or other components local or remote to one another. Additionally, the units can be moved from one device and added to another device, and/or can be included in both devices. The units can be implemented in software stored in memory or non-transitory computer-readable medium. The software stored in the memory or medium can run on a processor or circuitry (e.g., ASIC, PLA, DSP, FPGA, or any other integrated circuit) capable of executing computer instructions or computer code. The units can also be implemented in hardware using processors or circuitry on the same or different integrated circuit.

In one embodiment, the media file includes a track, the track contains one or more samples, and each sample corresponds to one frame in the point cloud media.

The cross-attribute dependency indication information is set in a sample entry of the track, and the cross-attribute dependency indication information is further configured for indicating that the encoding and decoding dependency relationship between the attribute data in the point cloud bitstream is consistent across all samples of the track.

In one embodiment, the media file includes a track, the track contains a cross-attribute dependency sample group, the cross-attribute dependency sample group contains one or more samples, and one sample corresponds to one frame in the point cloud media. Any one sample in the cross-attribute dependency sample group contains or corresponds to depended attribute data; or any one sample in the cross-attribute dependency sample group contains or corresponds to depending attribute data.

The cross-attribute dependency indication information is set in an entry of the cross-attribute dependency sample group, and the cross-attribute dependency indication information is further configured for indicating that the encoding and decoding dependency relationship between the attribute data in the point cloud bitstream changes across all samples of the track.

In one embodiment, the cross-attribute dependency indication information is configured for indicating the encoding and decoding dependency relationship between two or more sets of attribute data in the point cloud bitstream. The cross-attribute dependency indication information is represented as a cross-attribute dependency information data box, and the cross-attribute dependency information data box contains at least one of the following fields: a depended attribute data number field, a depended attribute data identifier field, a depending attribute data number field, and a depending attribute data identifier field.

The depended attribute data number field is configured for indicating a number of sets of depended attribute data contained by or corresponding to a current track, or the depended attribute data number field is configured for indicating a number of sets of depended attribute data contained by or corresponding to a current sample. The depended attribute data identifier field is configured for indicating an identifier of the depended attribute data. The depending attribute data number field is configured for indicating a number of sets of other attribute data depending on current attribute data. The depending attribute data identifier field is configured for indicating an identifier of other attribute data depending on the current attribute data.

The current track refers to a track being decoded in the media file, the current sample refers to a sample being decoded in the current track, and the current attribute data refers to attribute data being decoded in the current sample.

In one embodiment, the cross-attribute dependency indication information is configured for indicating the encoding and decoding dependency relationship between any two sets of attribute data in the point cloud bitstream. The cross-attribute dependency indication information is represented as a cross-attribute dependency information data box, and the cross-attribute dependency information data box contains the depended attribute data number field, the depending attribute data identifier field, and the depended attribute data identifier field.

The depended attribute data number field is configured for indicating a number of sets of depended attribute data contained by or corresponding to a current track, or the depended attribute data number field is configured for indicating a number of sets of depended attribute data contained by or corresponding to a current sample. The depending attribute data identifier field is configured for indicating an identifier of depending attribute data in the any two sets attribute data. The depended attribute data identifier field is configured for indicating an identifier of depended attribute data in the any two sets of attribute data.

The current track refers to a track being decoded in the media file, and the current sample refers to a sample being decoded in the current track.

In one embodiment, the point cloud bitstream only contains a first type of attribute data and a second type of attribute data. The cross-attribute dependency indication information is configured for indicating an encoding and decoding dependency relationship between the first type of attribute data and the second type of attribute data. The cross-attribute dependency indication information is represented as a cross-attribute dependency information data box, and the cross-attribute dependency information data box contains a depended attribute data type field.

If the depended attribute data type field is of a first value, the second type of attribute data depends on the first type of attribute data.

If the depended attribute data type field is of a second value, the first type of attribute data depends on the second type of attribute data.

In one embodiment, the media file includes one or more attribute component tracks, and the attribute data having the encoding and decoding dependency relationship in the point cloud bitstream is in different attribute component tracks.

An association relationship between the different attribute component tracks is represented by a track group.

In one embodiment, the media file contains a track group type data box, and the track group type data box is configured for indicating the attribute component track to which the attribute data having the encoding and decoding dependency relationship in the point cloud bitstream belongs.

The cross-attribute dependency indication information is represented as a cross-attribute dependency information data box, and the cross-attribute dependency information data box is set in the track group type data box.

In one embodiment, the media file includes one or more attribute component tracks, and the attribute data having the encoding and decoding dependency relationship in the point cloud bitstream is in different attribute component tracks.

The media file contains a track reference type data box, the track reference type data box includes a track identifier, and the track identifier is configured for indicating the attribute component track to which the depended attribute data in the attribute data having the encoding and decoding dependency relationship belongs.

The track reference type data box is set in the attribute component track to which the depending attribute data in the attribute data having the encoding and decoding dependency relationship belongs.

If a current attribute component track contains the track identifier, at least one sample in the current attribute component track depends on at least one sample in the attribute component track indicated by the track identifier during decoding.

The current attribute component track refers to an attribute component track being decoded.

In one embodiment, the track identifier is configured for indicating the attribute component track to which the depending attribute data in the attribute data having the encoding and decoding dependency relationship belongs. The track reference type data box is set in the attribute component track to which the depended attribute data in the attribute data having the encoding and decoding dependency relationship belongs.

If the current attribute component track contains the track identifier, at least one sample in the attribute component track indicated by the track identifier depends on at least one sample in the current attribute component track.

The current attribute component track refers to an attribute component track being decoded.

In one embodiment, the media file includes a track, the track contains one or more samples, and each sample corresponds to one frame in the point cloud media.

One sample is divided into one or more slices, and each slice is represented by one subsample.

The cross-attribute dependency indication information is set in a subsample information data box.

In one embodiment, the cross-attribute dependency indication information contains a cross-attribute dependency flag field and an attribute data identifier field.

If the cross-attribute dependency flag field is of a first preset value, the current attribute data depends on other attribute data during decoding.

If the cross-attribute dependency flag field is of a second preset value, the current attribute data does not depend on other attribute data during decoding.

The attribute data identifier field is configured for indicating an identifier of the current attribute data.

The current attribute data refers to attribute data being decoded in the subsample.

In one embodiment, the media file includes a track, the track contains one or more samples, and each sample corresponds to one frame in the point cloud media.

The media file further includes a component information data box, and the component information data box contains a type of a component in the track. If the type of the component is attribute data, the component information data box further includes an attribute identifier field. The attribute identifier field is configured for indicating an identifier of current attribute data, and the current attribute data refers to attribute data being decoded.

In one embodiment, the point cloud media is transmitted through streaming. When obtaining the media file of the point cloud media, the obtaining unit 501 may be specifically configured to:

obtain transmission signaling of the point cloud media, the transmission signaling containing the cross-attribute dependency indication information; and obtain the media file of the point cloud media based on the transmission signaling.

In one embodiment, the transmission signaling is DASH signaling, and the cross-attribute dependency indication information refers to a cross-attribute dependency information descriptor in the DASH signaling.

When the cross-attribute dependency information descriptor is present in an adaptation set hierarchy, the cross-attribute dependency information descriptor is configured for describing all representations in the adaptation set hierarchy.

When the cross-attribute dependency information descriptor is present in a representation hierarchy, the cross-attribute dependency information descriptor is configured for describing the representations in the corresponding representation hierarchy.

When the cross-attribute dependency information descriptor is present in a preselection hierarchy, the cross-attribute dependency information descriptor is configured for describing point cloud media corresponding to the preselection hierarchy.

In one embodiment, the cross-attribute dependency information descriptor includes at least one of the following elements: a depended attribute data identifier element, a depended attribute data type element, a depending attribute data identifier element, and a depending attribute data type element.

The depended attribute data identifier element is configured for indicating an identifier of the depended attribute data. The depended attribute data type element is configured for indicating a type of the depended attribute data. The depending attribute data identifier element is configured for indicating an identifier of other attribute data depending on current attribute data. The depending attribute data type element is configured for indicating a type of other attribute data depending on the current attribute data.

The current attribute data refers to attribute data being decoded.

In one embodiment, the transmission signaling is DASH signaling, and the cross-attribute dependency indication information refers to a dependency identifier field in the DASH signaling.

In the attribute data having the encoding and decoding dependency relationship, the dependency identifier field is set in a representation corresponding to the depending attribute data, and the dependency identifier field is configured for indicating an identifier of a representation corresponding to the depended attribute data.

In one embodiment, the transmission signaling is SMT signaling, and the cross-attribute dependency indication information refers to an asset group descriptor in the SMT signaling.

In the attribute data having the encoding and decoding dependency relationship, the asset group descriptor is set in an asset corresponding to the depending attribute data. The asset group descriptor includes a dependency flag, a number of dependencies field, and an asset identifier field.

The dependency flag is set to a first preset value. The number of dependencies field is configured for indicating a number of sets of other attribute data on which the depending attribute data depends during decoding. The asset identifier field is configured for indicating an asset identifier corresponding to the depended attribute data.

In one embodiment, when decoding the point cloud bitstream based on the cross-attribute dependency indication information, the processing unit 502 may be specifically configured to:

determine attribute data on which the current attribute data depends based on the encoding and decoding dependency relationship indicated by the cross-attribute dependency indication information;

decode the attribute data on which the current attribute data depends; and decode the current attribute data after decoding the attribute data on which the current attribute data depends.

In the embodiments of this disclosure, the media file of the point cloud media is obtained, the media file includes the point cloud bitstream and the cross-attribute dependency indication information of the point cloud media, and the cross-attribute dependency indication information is configured for indicating the encoding and decoding dependency relationship between the attribute data in the point cloud bitstream. The point cloud bitstream is decoded based on the cross-attribute dependency indication information to present the point cloud media. In such a case, transmission, decoding, and presentation of the point cloud media are guided, partial transmission and partial decoding at the decoding terminal are supported, and utilization of the network bandwidths and the computing resources of the decoding terminal is optimized.

Figure 6:
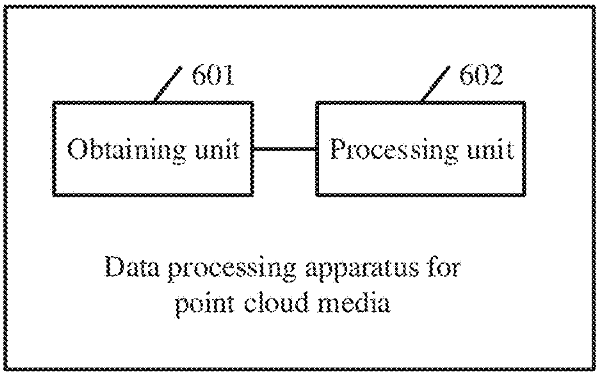
FIG. 6 is a schematic structural diagram of a data processing apparatus for point cloud media provided in another exemplary embodiment of this disclosure.

Referring to FIG. 6, FIG. 6 is a schematic structural diagram of a data processing apparatus for point cloud media provided in embodiments of this disclosure. The data processing apparatus for point cloud media may be set in a computer device provided in embodiments of this disclosure, and the computer device may be the content production device mentioned in the aforementioned method embodiments. The data processing apparatus for point cloud media shown in FIG. 6 may be a computer program (including program code) running in a computer device, and the data processing apparatus for point cloud media may be configured to perform some or all of the operations in the method embodiment shown in FIG. 4. Referring to FIG. 6, the data processing apparatus for point cloud media may include the following units:

an obtaining unit 601, configured to obtain point cloud media; and a processing unit 602, configured to encode the point cloud media to obtain a point cloud bitstream.

The processing unit 602 is further configured to generate cross-attribute dependency indication information based on an encoding and decoding dependency relationship between attribute data in the point cloud bitstream.

The processing unit 602 is further configured to encapsulate the cross-attribute dependency indication information and the point cloud bitstream to obtain a media file of the point cloud media.

In one embodiment, when encapsulating the cross-attribute dependency indication information and the point cloud bitstream to obtain the media file of the point cloud media, the processing unit 602 may be specifically configured to:

encapsulate the point cloud bitstream in a track, the track containing one or more samples, and each sample corresponding to one frame in the point cloud media; and set the cross-attribute dependency indication information in a sample entry of the track to form the media file of the point cloud media if the cross-attribute dependency indication information indicates that the encoding and decoding dependency relationship between the attribute data in the point cloud bitstream is consistent across all samples of the track.

In one embodiment, when encapsulating the cross-attribute dependency indication information and the point cloud bitstream to obtain the media file of the point cloud media, the processing unit 602 may be specifically configured to:

encapsulate the point cloud bitstream in a track, the track containing one or more samples, and each sample corresponding to one frame in the point cloud media; and form a cross-attribute dependency sample group in the track, the cross-attribute dependency sample group containing one or more samples, and any one sample in the cross-attribute dependency sample group containing or corresponding to depended attribute data; or any one sample in the cross-attribute dependency sample group containing or corresponding to depending attribute data.

If the cross-attribute dependency indication information indicates that the encoding and decoding dependency relationship between the attribute data in the point cloud bitstream changes across all samples of the track, the cross-attribute dependency indication information is set in an entry of the cross-attribute dependency sample group to form the media file of the point cloud media.

In one embodiment, the cross-attribute dependency indication information is configured for indicating the encoding and decoding dependency relationship between two or more sets of attribute data in the point cloud bitstream. The cross-attribute dependency indication information is represented as a cross-attribute dependency information data box, and the cross-attribute dependency information data box contains at least one of the following fields: a depended attribute data number field, a depended attribute data identifier field, a depending attribute data number field, and a depending attribute data identifier field.

The depended attribute data number field is configured for indicating a number of sets of depended attribute data contained by or corresponding to a current track, or the depended attribute data number field is configured for indicating a number of sets of depended attribute data contained by or corresponding to a current sample. The depended attribute data identifier field is configured for indicating an identifier of the depended attribute data. The depending attribute data number field is configured for indicating a number of sets of other attribute data depending on current attribute data. The depending attribute data identifier field is configured for indicating an identifier of other attribute data depending on the current attribute data.

The current track refers to a track being encoded in the media file, the current sample refers to a sample being encoded in the current track, and the current attribute data refers to attribute data being encoded in the current sample.

In one embodiment, the cross-attribute dependency indication information is configured for indicating the encoding and decoding dependency relationship between any two sets of attribute data in the point cloud bitstream. The cross-attribute dependency indication information is represented as a cross-attribute dependency information data box, and the cross-attribute dependency information data box contains the depended attribute data number field, the depending attribute data identifier field, and the depended attribute data identifier field.

The depended attribute data number field is configured for indicating a number of sets of depended attribute data contained by or corresponding to a current track, or the depended attribute data number field is configured for indicating a number of sets of depended attribute data contained by or corresponding to a current sample. The depending attribute data identifier field is configured for indicating an identifier of depending attribute data in the any two sets attribute data. The depended attribute data identifier field is configured for indicating an identifier of depended attribute data in the any two sets of attribute data.

The current track refers to a track being encoded in the media file, and the current sample refers to a sample being encoded in the current track.

In one embodiment, the point cloud bitstream only contains a first type of attribute data and a second type of attribute data. The cross-attribute dependency indication information is configured for indicating an encoding and decoding dependency relationship between the first type of attribute data and the second type of attribute data. The cross-attribute dependency indication information is represented as a cross-attribute dependency information data box, and the cross-attribute dependency information data box contains a depended attribute data type field. When generating the cross-attribute dependency indication information based on the encoding and decoding dependency relationship between the attribute data in the point cloud bitstream, the processing unit 602 may be specifically configured to:

set the depended attribute data type field to a first value if the second type of attribute data depends on the first type of attribute data; and set the depended attribute data type field to a second value if the first type of attribute data depends on the second type of attribute data.

In one embodiment, when encapsulating the cross-attribute dependency indication information and the point cloud bitstream to obtain the media file of the point cloud media, the processing unit 602 may be specifically configured to:

encapsulate the point cloud bitstream to obtain one or more attribute component tracks; the attribute data having the encoding and decoding dependency relationship in the point cloud bitstream being in different attribute component tracks; and represent an association relationship between the different attribute component tracks by a track group to form the media file of point cloud media.

In one embodiment, the media file contains a track group type data box, and the track group type data box is configured for indicating the attribute component track to which the attribute data having the encoding and decoding dependency relationship in the point cloud bitstream belongs.

The cross-attribute dependency indication information is represented as a cross-attribute dependency information data box, and the cross-attribute dependency information data box is set in the track group type data box.

In one embodiment, the media file includes one or more attribute component tracks, and the attribute data having the encoding and decoding dependency relationship in the point cloud bitstream is in different attribute component tracks.

The media file contains a track reference type data box, the track reference type data box includes a track identifier, and the track identifier is configured for indicating the attribute component track to which the depended attribute data in the attribute data having the encoding and decoding dependency relationship belongs.

The track reference type data box is set in the attribute component track to which the depending attribute data in the attribute data having the encoding and decoding dependency relationship belongs.

If a current attribute component track contains the track identifier, at least one sample in the current attribute component track depends on at least one sample in the attribute component track indicated by the track identifier during encoding. The current attribute component track refers to an attribute component track being encoded.

In one embodiment, the media file includes one or more attribute component tracks, and the attribute data having the encoding and decoding dependency relationship in the point cloud bitstream is in different attribute component tracks. The media file contains a track reference type data box, and the track reference type data box includes a track identifier.

The track identifier is configured for indicating the attribute component track to which the depending attribute data in the attribute data having the encoding and decoding dependency relationship belongs. The track reference type data box is set in the attribute component track to which the depended attribute data in the attribute data having the encoding and decoding dependency relationship belongs.

If the current attribute component track contains the track identifier, at least one sample in the attribute component track indicated by the track identifier depends on at least one sample in the current attribute component track.

The current attribute component track refers to an attribute component track being encoded.

In one embodiment, when encapsulating the cross-attribute dependency indication information and the point cloud bitstream to obtain the media file of the point cloud media, the processing unit 602 may be specifically configured to:

encapsulate the point cloud bitstream in a track, the track containing one or more samples, and each sample corresponding to one frame in the point cloud media; and divide one sample into one or more slices, each slice being represent by one subsample; and set the cross-attribute dependency indication information in a subsample information data box to form the media file of the point cloud media.

In one embodiment, the cross-attribute dependency indication information contains a cross-attribute dependency flag field and an attribute data identifier field. When setting the cross-attribute dependency indication information in the subsample information data box, the processing unit 602 may be specifically configured to:

set the cross-attribute dependency flag field to a first preset value if the current attribute data depends on other attribute data during encoding; and set the cross-attribute dependency flag field to a second preset value if the current attribute data does not depend on other attribute data during encoding.

The attribute data identifier field is configured for indicating an identifier of the current attribute data.

The current attribute data refers to attribute data in the subsample being encoded.

In one embodiment, the media file includes a track, the track contains one or more samples, and each sample corresponds to one frame in the point cloud media.

The media file further includes a component information data box, and the component information data box contains a type of a component in the track. If the type of the component is attribute data, the component information data box further includes an attribute identifier field. The attribute identifier field is configured for indicating an identifier of current attribute data, and the current attribute data refers to attribute data being decoded.

In one embodiment, the point cloud media is transmitted through streaming. The processing unit 602 is further configured to:

transmit the media file of the point cloud media based on transmission signaling, the transmission signaling containing the cross-attribute dependency indication information.

In one embodiment, the transmission signaling is DASH signaling.

the cross-attribute dependency indication information refers to a cross-attribute dependency information descriptor in the DASH signaling or a dependency identifier field in the DASH signaling; or the transmission signaling is SMT signaling, and the cross-attribute dependency indication information refers to an asset group descriptor in the SMT signaling.

In one embodiment, the transmission signaling is DASH signaling, and the cross-attribute dependency indication information refers to a cross-attribute dependency information descriptor in the DASH signaling.

When the cross-attribute dependency information descriptor is present in an adaptation set hierarchy, the cross-attribute dependency information descriptor is configured for describing all representations in the adaptation set hierarchy.

When the cross-attribute dependency information descriptor is present in a representation hierarchy, the cross-attribute dependency information descriptor is configured for describing the representations in the corresponding representation hierarchy.

When the cross-attribute dependency information descriptor is present in a preselection hierarchy, the cross-attribute dependency information descriptor is configured for describing point cloud media corresponding to the preselection hierarchy.

In one embodiment, the cross-attribute dependency information descriptor includes at least one of the following elements: a depended attribute data identifier element, a depended attribute data type element, a depending attribute data identifier element, and a depending attribute data type element.

The depended attribute data identifier element is configured for indicating an identifier of the depended attribute data. The depended attribute data type element is configured for indicating a type of the depended attribute data. The depending attribute data identifier element is configured for indicating an identifier of other attribute data depending on current attribute data. The depending attribute data type element is configured for indicating a type of other attribute data depending on the current attribute data.

The current attribute data refers to attribute data being encoded.

In one embodiment, the transmission signaling is DASH signaling, and the cross-attribute dependency indication information refers to a dependency identifier field in the DASH signaling.

In the attribute data having the encoding and decoding dependency relationship, the dependency identifier field is set in a representation corresponding to the depending attribute data, and the dependency identifier field is configured for indicating an identifier of a representation corresponding to the depended attribute data.

In one embodiment, the transmission signaling is SMT signaling, and the cross-attribute dependency indication information refers to an asset group descriptor in the SMT signaling.

In the attribute data having the encoding and decoding dependency relationship, the asset group descriptor is set in an asset corresponding to the depending attribute data. The asset group descriptor includes a dependency flag, a number of dependencies field, and an asset identifier field.

The dependency flag is set to a first preset value. The number of dependencies field is configured for indicating a number of sets of other attribute data on which the depending attribute data depends during decoding. The asset identifier field is configured for indicating an asset identifier corresponding to the depended attribute data.

In the embodiments of this disclosure, the point cloud media is obtained and encoded to obtain the point cloud bitstream; the cross-attribute dependency indication information is generated based on the encoding and decoding dependency relationship between the attribute data in the point cloud bitstream; and the cross-attribute dependency indication information and the point cloud bitstream are encapsulated to obtain the media file of the point cloud media. The generation of the cross-attribute dependency indication information facilitates guidance for decoding of the point cloud bitstream.

Figure 7:
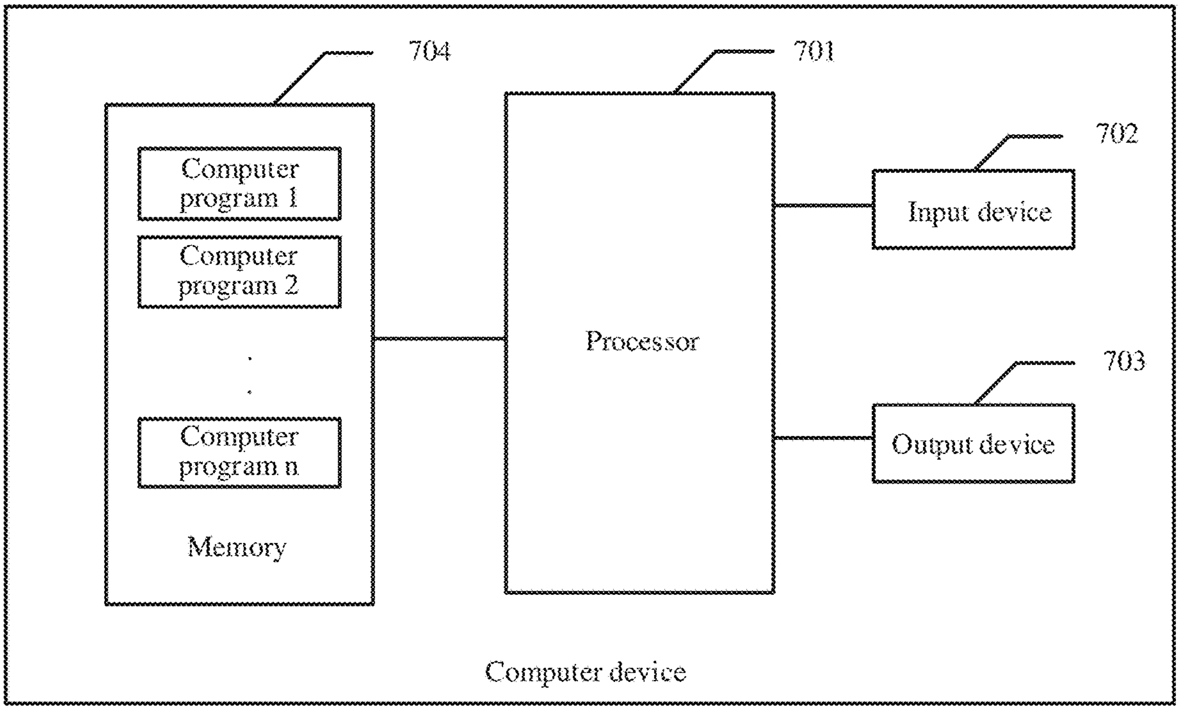
FIG. 7 is a schematic structural diagram of a computer device provided in another exemplary embodiment of this disclosure.

Further, an embodiment of this disclosure provides a computer device, and a schematic structural diagram of the computer device may refer to FIG. 7. The computer device may be the aforementioned media processing device or content production device. The computer device may include: a processor 701, an input device 702, an output device 703, and a memory 704. The processor 701, the input device 702, the output device 703, and the memory 704 are connected via buses. The memory 704 is configured to store a computer program, the computer program includes program instructions, and the processor 701 is configured to execute the program instructions stored in the memory 704.

When the computer device is the aforementioned media processing device, in the embodiment of this disclosure, the processor 701 performs the following operations by running executable program codes in the memory 704:

obtain a media file of point cloud media, the media file including a point cloud bitstream and cross-attribute dependency indication information of the point cloud media, and the cross-attribute dependency indication information being configured for indicating an encoding and decoding dependency relationship between attribute data in the point cloud bitstream; and decode the point cloud bitstream based on the cross-attribute dependency indication information to present the point cloud media.

In the embodiment of this disclosure, the media file of the point cloud media is obtained, the media file includes the point cloud bitstream and the cross-attribute dependency indication information of the point cloud media, and the cross-attribute dependency indication information is configured for indicating the encoding and decoding dependency relationship between the attribute data in the point cloud bitstream. The point cloud bitstream is decoded based on the cross-attribute dependency indication information to present the point cloud media. In such a case, transmission, decoding, and presentation of the point cloud media are guided, partial transmission and partial decoding at the decoding terminal are supported, and utilization of the network bandwidths and the computing resources of the decoding terminal is optimized.

In one embodiment, when the computer device is the aforementioned content production device, in the embodiment of this disclosure, the processor 701 performs the following operations by running executable program codes in the memory 704:

obtain point cloud media and encode the point cloud media to obtain a point cloud bitstream;

generate cross-attribute dependency indication information based on an encoding and decoding dependency relationship between attribute data in the point cloud bitstream; and encapsulate the cross-attribute dependency indication information and the point cloud bitstream to obtain a media file of the point cloud media.

In the embodiment of this disclosure, the point cloud media is obtained and encoded to obtain the point cloud bitstream; the cross-attribute dependency indication information is generated based on the encoding and decoding dependency relationship between the attribute data in the point cloud bitstream; and the cross-attribute dependency indication information and the point cloud bitstream are encapsulated to obtain the media file of the point cloud media. The generation of the cross-attribute dependency indication information facilitates guidance for decoding of the point cloud bitstream.

In addition, an embodiment of this disclosure further provides a computer-readable storage medium, having a computer program stored therein, and the computer program includes program instructions. When the program instructions are executed by a processor, the methods in the embodiments corresponding to FIG. 3 and FIG. 4 can be executed, and descriptions thereof are omitted herein. For technical details not disclosed in the embodiment of the computer-readable storage medium involved in this disclosure, please refer to the description of the method embodiments of this disclosure. As an example, the program instructions may be deployed to be executed on one computer device, or on multiple computer devices located in one location, or on multiple computer devices distributed across multiple locations and interconnected via communication networks.

Based on one aspect of this disclosure, a computer program product is provided. The computer program product includes a computer program, and the computer program is stored in a computer-readable storage medium.

The processor of the computer device reads the computer program from the computer-readable storage medium, and the processor executes the computer program to enable the computer device to execute the methods in the embodiments corresponding to FIG. 3 and FIG. 4, and descriptions thereof are omitted herein.

Those of ordinary skill in the art may understand that all or part of the processes of the methods in the aforementioned embodiments may be implemented by instructing related hardware via a computer program. The program may be stored in a computer-readable storage medium, and when executed, the program may include the processes in the aforementioned method embodiments. The storage medium may be a magnetic disk, an optical disc, a read-only memory (ROM), a random access memory (RAM), or the like.

Disclosed above is only a preferred embodiment of this disclosure, and certainly, the scope of rights of this disclosure cannot be limited thereto. Those of ordinary skill in the art can understand and implement all or part of the processes of the aforementioned embodiments, and equivalent changes made according to the claims of this disclosure still fall within the scope of the disclosure.

What is claimed is:

1. A data processing method for point cloud media, the method being executed by a media processing device and comprising:

obtaining a media file of point cloud media, the media file comprising a point cloud bitstream and cross-attribute dependency indication information of the point cloud media, and the cross-attribute dependency indication information being for indicating an encoding and decoding dependency relationship between depending attribute data of a first attribute type and depended attribute data of a second attribute type in the point cloud bitstream, the first attribute type being different from the second attribute type, wherein the media file further comprises a track, the track contains one or more samples, and each of the one or more samples corresponds to one frame in the point cloud media, and the cross-attribute dependency indication information is set in a sample entry of the track, and the cross-attribute dependency indication information is further for indicating that the encoding and decoding dependency relationship between the attribute data in the point cloud bitstream is consistent across all samples of the track; and decoding the point cloud bitstream based on the cross-attribute dependency indication information to present the point cloud media.

2. The method according to claim 1, wherein the media file comprises a track, the track contains a cross-attribute dependency sample group, the cross-attribute dependency sample group contains one or more samples, and each of the one or more samples corresponds to one frame in the point cloud media;

the each sample in the cross-attribute dependency sample group contains or corresponds to depended attribute data; or the each sample in the cross-attribute dependency sample group contains or corresponds to depending attribute data; and the cross-attribute dependency indication information is set in an entry of the cross-attribute dependency sample group, and the cross-attribute dependency indication information is further for indicating that the encoding and decoding dependency relationship between the attribute data in the point cloud bitstream changes across all samples of the track.

3. The method according to claim 1, wherein the cross-attribute dependency indication information is for indicating the encoding and decoding dependency relationship between two or more sets of attribute data in the point cloud bitstream;

the cross-attribute dependency indication information is represented as a cross-attribute dependency information data box, and the cross-attribute dependency information data box contains at least one of the following fields: a depended attribute data number field, a depended attribute data identifier field, a depending attribute data number field, and a depending attribute data identifier field;

the depended attribute data number field is for indicating a number of sets of depended attribute data contained by or corresponding to a current track, or the depended attribute data number field is for indicating a number of sets of depended attribute data contained by or corresponding to a current sample;

the depended attribute data identifier field is for indicating an identifier of the depended attribute data;

the depending attribute data number field is for indicating a number of sets of other attribute data depending on current attribute data;

the depending attribute data identifier field is for indicating an identifier of other attribute data depending on the current attribute data; and wherein the current track refers to a track being decoded in the media file, the current sample refers to a sample being decoded in the current track, and the current attribute data refers to attribute data being decoded in the current sample.

4. The method according to claim 1, wherein the cross-attribute dependency indication information is for indicating the encoding and decoding dependency relationship between any two sets of attribute data in the point cloud bitstream;

the cross-attribute dependency indication information is represented as a cross-attribute dependency information data box, and the cross-attribute dependency information data box contains a depended attribute data number field, a depending attribute data identifier field, and a depended attribute data identifier field;

the depended attribute data number field is for indicating a number of sets of depended attribute data contained by or corresponding to a current track, or the depended attribute data number field is configured for indicating a number of sets of depended attribute data contained by or corresponding to a current sample;

the depending attribute data identifier field is for indicating an identifier of depending attribute data in the any two sets of attribute data;

the depended attribute data identifier field is for indicating an identifier of depended attribute data in the any two sets of attribute data; and wherein the current track refers to a track being decoded in the media file, and the current sample refers to a sample being decoded in the current track.

5. The method according to claim 1, wherein the point cloud bitstream only contains a first type of attribute data and a second type of attribute data;

the cross-attribute dependency indication information is for indicating an encoding and decoding dependency relationship between the first type of attribute data and the second type of attribute data;

the cross-attribute dependency indication information is represented as a cross-attribute dependency information data box, and the cross-attribute dependency information data box contains a depended attribute data type field;

in response to the depended attribute data type field being of a first value, the second type of attribute data depends on the first type of attribute data; and in response to the depended attribute data type field is being a second value, the first type of attribute data depends on the second type of attribute data.

6. The method according to claim 1, wherein the media file comprises one or more attribute component tracks, and the attribute data having the encoding and decoding dependency relationship in the point cloud bitstream is in different attribute component tracks; and an association relationship between the different attribute component tracks is represented by a track group.

7. The method according to claim 6, wherein the media file contains a track group type data box, and the track group type data box is for indicating the attribute component track to which the attribute data having the encoding and decoding dependency relationship in the point cloud bitstream belongs; and the cross-attribute dependency indication information is represented as a cross-attribute dependency information data box, and the cross-attribute dependency information data box is set in the track group type data box.

8. The method according to claim 1, wherein the media file comprises one or more attribute component tracks, and the attribute data having the encoding and decoding dependency relationship in the point cloud bitstream is in different attribute component tracks;

the media file contains a track reference type data box, and the track reference type data box comprises a track identifier;

the track identifier is for indicating the attribute component track to which the depended attribute data in the attribute data having the encoding and decoding dependency relationship belongs;

the track reference type data box is set in the attribute component track to which the depending attribute data in the attribute data having the encoding and decoding dependency relationship belongs;

in response to a current attribute component track containing the track identifier, at least one sample in the current attribute component track depends on at least one sample in the attribute component track indicated by the track identifier during decoding; and wherein the current attribute component track refers to an attribute component track being decoded.

9. The method according to claim 1, wherein the media file comprises one or more attribute component tracks, and the attribute data having the encoding and decoding dependency relationship in the point cloud bitstream is in different attribute component tracks;

the media file contains a track reference type data box, and the track reference type data box comprises a track identifier;

the track identifier is for indicating the attribute component track to which the depending attribute data in the attribute data having the encoding and decoding dependency relationship belongs;

the track reference type data box is set in the attribute component track to which the depended attribute data in the attribute data having the encoding and decoding dependency relationship belongs;

in response to a current attribute component track containing the track identifier, at least one sample in the attribute component track indicated by the track identifier depends on at least one sample in the current attribute component track; and wherein the current attribute component track refers to an attribute component track being decoded.

10. The method according to claim 1, wherein the media file comprises a track, the track contains one or more samples, and each sample corresponds to one frame in the point cloud media;

one sample is divided into one or more slices, and each of the one or more slices is represented by one subsample; and the cross-attribute dependency indication information is set in a subsample information data box.

11. The method according to claim 10, wherein the cross-attribute dependency indication information contains a cross-attribute dependency flag field and an attribute data identifier field;

in response to the cross-attribute dependency flag field being of a first preset value, current attribute data depends on other attribute data during decoding;

in response to the cross-attribute dependency flag field being of a second preset value, the current attribute data does not depend on other attribute data during decoding;

the attribute data identifier field is for indicating an identifier of the current attribute data; and wherein the current attribute data refers to attribute data being decoded in the subsample.

12. The method according to claim 1, wherein the media file comprises a track, the track contains one or more samples, and each of the one or more samples corresponds to one frame in the point cloud media; and the media file further comprises a component information data box, and the component information data box contains a type of a component in the track;

in response to the type of the component being attribute data, the component information data box further comprises an attribute identifier field, the attribute identifier field is for indicating an identifier of current attribute data, and the current attribute data refers to attribute data being decoded.

13. The method according to claim 1, wherein the point cloud media is transmitted through streaming, and the obtaining the media file of point cloud media comprises:

obtaining transmission signaling of the point cloud media, the transmission signaling containing the cross-attribute dependency indication information; and obtaining the media file of the point cloud media based on the transmission signaling.

14. The method according to claim 13, wherein the transmission signaling is dynamic adaptive streaming signaling, and the cross-attribute dependency indication information refers to a cross-attribute dependency information descriptor in the dynamic adaptive streaming signaling;

when the cross-attribute dependency information descriptor is present in an adaptation set hierarchy, the cross-attribute dependency information descriptor is for describing all representations in the adaptation set hierarchy;

when the cross-attribute dependency information descriptor is present in a representation hierarchy, the cross-attribute dependency information descriptor is for describing the representations in the corresponding representation hierarchy; and when the cross-attribute dependency information descriptor is present in a preselection hierarchy, the cross-attribute dependency information descriptor is for describing point cloud media corresponding to the preselection hierarchy.

15. The method according to claim 14, wherein the cross-attribute dependency information descriptor comprises at least one of a depended attribute data identifier element, a depended attribute data type element, a depending attribute data identifier element, or a depending attribute data type element;

the depended attribute data identifier element is for indicating an identifier of the depended attribute data;

the depended attribute data type element is for indicating a type of the depended attribute data;

the depending attribute data identifier element is for indicating an identifier of other attribute data depending on current attribute data;

the depending attribute data type element is for indicating a type of other attribute data depending on the current attribute data; and wherein the current attribute data refers to attribute data being decoded.

16. The method according to claim 13, wherein the transmission signaling is dynamic adaptive streaming signaling, and the cross-attribute dependency indication information refers to a dependency identifier field in the dynamic adaptive streaming signaling; and in the attribute data having the encoding and decoding dependency relationship, the dependency identifier field is set in a representation corresponding to the depending attribute data, and the dependency identifier field is for indicating an identifier of a representation corresponding to the depended attribute data.

17. The method according to claim 1, wherein the decoding the point cloud bitstream based on the cross-attribute dependency indication information comprises:

determining the attribute data on which current attribute data depends based on the encoding and decoding dependency relationship indicated by the cross-attribute dependency indication information;

decoding the attribute data on which the current attribute data depends; and decoding the current attribute data after decoding the attribute data on which the current attribute data depends.

18. A data processing method for point cloud media, the method being executed by a content production device, and comprising:

obtaining point cloud media, and encoding the point cloud media to obtain a point cloud bitstream;

generating cross-attribute dependency indication information based on an encoding and decoding dependency relationship between depending attribute data of a first attribute type and depended attribute data of a second attribute type in the point cloud bitstream, the first attribute type being different from the second attribute type; and encapsulating the cross-attribute dependency indication information and the point cloud bitstream to obtain a media file of the point cloud media, wherein the media file further comprises a track, the track contains one or more samples, and each of the one or more samples corresponds to one frame in the point cloud media, and the cross-attribute dependency indication information is set in a sample entry of the track, and the cross-attribute dependency indication information is further for indicating that the encoding and decoding dependency relationship between the attribute data in the point cloud bitstream is consistent across all samples of the track.

19. A data processing apparatus for point cloud media, comprising:

a memory operable to store computer-readable instructions; and a processor circuitry operable to read the computer-readable instructions, the processor circuitry when executing the computer-readable instructions is configured to:

obtain a media file of point cloud media, the media file comprising a point cloud bitstream and cross-attribute dependency indication information of the point cloud media, and the cross-attribute dependency indication information being for indicating an encoding and decoding dependency relationship between depending attribute data of a first attribute type and depended attribute data of a second attribute type in the point cloud bitstream, the first attribute type being different from the second attribute type, wherein the media file further comprises a track, the track contains one or more samples, and each of the one or more samples corresponds to one frame in the point cloud media, and the cross-attribute dependency indication information is set in a sample entry of the track, and the cross-attribute dependency indication information is further for indicating that the encoding and decoding dependency relationship between the attribute data in the point cloud bitstream is consistent across all samples of the track; and decode the point cloud bitstream based on the cross-attribute dependency indication information to present the point cloud media.

* * * * *